US008253377B2

(12) United States Patent
Meincke et al.

(10) Patent No.: US 8,253,377 B2
(45) Date of Patent: Aug. 28, 2012

(54) HEARING AID BATTERY CHARGER

(75) Inventors: Hans Meincke, Birkerod (DK); Kim Rasmussen, Ballerup (DK)

(73) Assignee: GN ReSound A/S, Ballerup (DK)

( * ) Notice: Subject to any disclaimer, the term of this patent is extended or adjusted under 35 U.S.C. 154(b) by 794 days.

(21) Appl. No.: 12/281,929

(22) PCT Filed: Mar. 3, 2007

(86) PCT No.: PCT/DK2007/000111
§ 371 (c)(1),
(2), (4) Date: Dec. 15, 2008

(87) PCT Pub. No.: WO2007/101439
PCT Pub. Date: Sep. 13, 2007

(65) Prior Publication Data
US 2009/0200984 A1 Aug. 13, 2009

Related U.S. Application Data

(60) Provisional application No. 60/780,168, filed on Mar. 6, 2006.

(30) Foreign Application Priority Data

Mar. 6, 2006 (DK) ................................. 2006 00326

(51) Int. Cl.
H02J 7/00 (2006.01)
(52) U.S. Cl. ...................................................... 320/115
(58) Field of Classification Search .................. 320/115
See application file for complete search history.

(56) References Cited

U.S. PATENT DOCUMENTS

| 6,265,100 | B1 | 7/2001 | Saaski et al. |
| 6,658,124 | B1 | 12/2003 | Meadows |
| 2005/0017673 | A1 | 1/2005 | Tsukamoto et al. |
| 2005/0041827 | A1 | 2/2005 | Wu |

FOREIGN PATENT DOCUMENTS

| DE | 29718104 U1 | 2/1998 |
| EP | 0637119 A2 | 1/1995 |
| EP | 0637119 A3 | 5/1995 |
| GB | 2405269 A | 2/2005 |
| WO | 03067734 A2 | 8/2003 |

OTHER PUBLICATIONS

International Search Report and Written Opinion dated Oct. 5, 2009 for PCT/DK2007/000111.
Danish office action dated Oct. 5, 2006 for Denmark patent application No. PA 2006 00326/P/JMA.

*Primary Examiner* — Ramy Ramadan
(74) *Attorney, Agent, or Firm* — Vista IP Law Group, LLP

(57) ABSTRACT

A battery charger (10) for charging a rechargeable battery (45, 46) which is located in a hearing aid (18, 20), the battery charger (10) includes a power supply for supplying a charging current to the rechargeable battery (45, 46), a hearing aid connector for reception and accommodation of the hearing aid (18, 20), the connector having a set of first electrical terminals (36, 38) connected with the power supply and positioned for connection with the rechargeable battery (45, 46) when the hearing aid (18, 20) is positioned in the connector, and an actuator (32, 34) that is adapted for providing access to the battery (45, 46) for connection with the first electrical terminals (36, 38) when the hearing aid (18, 20) is positioned in the connector.

17 Claims, 23 Drawing Sheets

HEARING AID BATTERY CHARGER

RELATED APPLICATION DATA

Figure 1:
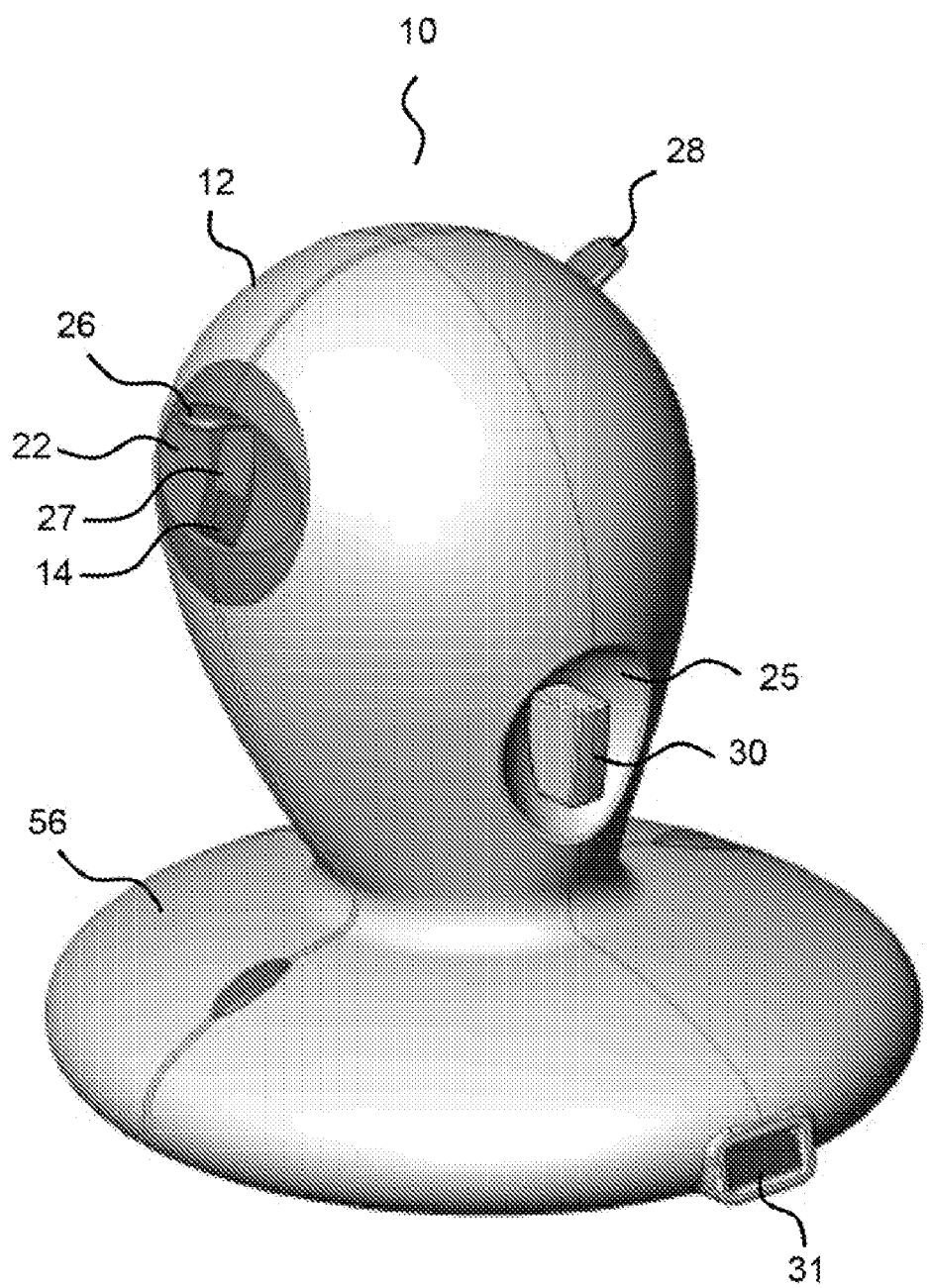

This application is the national stage of International Application No. PCT/DK2007/000111, filed on Mar. 3, 2007, which claims priority to and the benefit of Denmark Patent Application No. PA 2006 00326, filed on Mar. 6, 2006, and U.S. Provisional Patent Application No. 60/780,168, filed on Mar. 6, 2006, the entire disclosure of all of which is expressly incorporated by reference herein.

FIELD

The present application relates generally to a battery charger for a hearing aid with a rechargeable battery.

BACKGROUND AND SUMMARY

Hearing aids with rechargeable batteries are well known in the art. It is also well known to use a conventional charging device for recharging hearing aid batteries. However, the rechargeable battery has to be removed from the hearing aid and inserted in the charging device. After recharging the battery, the battery has to be re-inserted into the hearing aid.

Handling and replacement of batteries for a hearing aid is typically a difficult task for the hearing aid user, especially to disabled users, e.g. users with impaired vision and/or shaking hands. The handling difficulty is mainly due to the small size of the batteries, compartments for the batteries, and covers that must be opened to get access to the batteries. The operational time of hearing aid batteries is short and thus, frequent replacement of batteries is required.

WO 03/067734 discloses a method of supplying electrical power to the circuitry of a hearing aid, wherein a rechargeable battery is permanently fastened inside a battery lid or battery drawer of a hearing aid, and wherein the poles of the battery are available for contacting from the outside when the battery lid or drawer is open. The hearing aid is inserted into a charging device for charging the battery with the battery drawer or lid in the open position whereby connecting means of the charging device contacts the two poles of the hearing aid battery. A charging device for charging a hearing aid battery in a hearing aid is also disclosed. However, the hearing aid user still has to open and close the battery lid or drawer manually in order to charge a battery.

It is an object to provide a battery charger for rechargeable batteries in hearing aids that minimizes user-handling requirements.

In accordance with some embodiments, the above-mentioned and other objects are fulfilled by a battery charger for charging a rechargeable battery which is located in a hearing aid, the battery charger comprising a power supply for supplying a charging current to the rechargeable battery, a hearing aid connector for reception and accommodation of the hearing aid, the connector having a set of first electrical terminals connected with the power supply and positioned for connection with the rechargeable battery when the hearing aid is positioned in the connector, and an actuator adapted for providing access to the battery for connection with the first electrical terminals when the hearing aid is positioned in the connector.

The hearing aid may be a Behind the Ear (BTE), In the Ear (ITE), In the Canal (ITC) or Completely In the Canal (CIC), or another type of hearing aid.

Typically, a battery is accommodated in a hearing aid housing in a compartment formed by a support structure in the hearing aid housing that allows access to the battery poles for power supply of hearing aid circuitry by the battery. The support structure includes a battery cover, such as a battery lid or battery door, that can be opened by the user allowing the user to access and exchange batteries. The support structure may be arranged so that the battery is drawn out of the hearing aid housing together with a battery lid like a drawer, or a battery door may be hinged to the hearing aid housing so that it swings open thereby withdrawing the battery from the hearing aid housing in a rotational movement. The hearing aid is turned off when the battery cover is opened, and the hearing aid is turned on when the battery cover is fully closed.

It is an important advantage that the user is not required to perform any handling of the hearing aid battery in order to recharge the battery. When the user inserts the hearing aid into the battery charger, the battery cover, such as a battery lid or a battery door, to the battery compartment is automatically opened whereby the hearing aid is turned off and access is provided for the first electrical terminals of the battery charger to the battery poles so that the power supply may recharge the battery. The actuator may be adapted for engaging with and opening a battery cover of the hearing aid when the hearing aid is positioned in the connector, e.g. during insertion of the hearing aid into the connector, thereby allowing access to the battery for connection with the first electrical terminals.

The fact that the hearing aid is automatically turned off in the battery charger prevents the hearing aid from emitting sounds during charging and eliminates power consumption of the hearing aid circuitry during charging so that the duration of charging is minimized. Further, the hearing aid may perform data logging of various types of data relating to the operation and performance of the hearing aid in operation, for example a history of user-selected events such as changes between different signal processing algorithms, individual utilisation periods of the signal processing algorithms, statistical data relating to physical or psychological characteristics of the environments input signal data, etc. The fact that the hearing aid is turned off during charging prevents the data logging circuitry from storing useless data during the charging operation.

The battery charger is preferably enclosed in a battery charger housing. The housing encloses the hearing aid connector and has an opening for insertion of the hearing aid into the housing for support by the hearing aid connector. Further, the battery charger housing has at least one guide member positioned in relation to the opening for guiding the hearing aid towards the set of first electrical terminals during insertion of the hearing aid in the battery charger.

The actuator may be positioned in relation to the opening and the at least one guide member in such a way that it engages with and automatically opens the battery cover of the hearing aid during insertion of the hearing aid in the battery charger.

The battery charger may further comprise a closing member to partly close the battery cover of the hearing aid during removal of the hearing aid from the battery charger. The closing member may be positioned in relation to the opening and the at least one guide member in such a way that it pushes the battery cover into a partly closed position during removal of the hearing aid from the battery charger.

The battery cover of the hearing aid is preferably partly but not fully closed when the user removes the hearing aid from the battery charger. The partly closure of the battery cover ensures that the battery does not inadvertently fall out of its compartment in the hearing aid housing and also allows the user to turn the hearing aid on at a later time when the hearing aid is not needed immediately after charging.

The opening and the at least one guide member may be located in a removable part of the connector facilitating cleaning or substitution with a new part for hygienic reasons. The closing member may also be located in the removable part of the connector.

The removable part may be made of a soft material, such as silicone.

The removable part is preferably adapted for cleaning in a dish washing machine for ease of cleaning.

The removable part of the connector may have walls defining an internal volume for accommodation of a hearing aid during charging of its rechargeable battery. The walls may form guide members for guiding the hearing aid towards the set of first electrical terminals during insertion of the hearing aid into the connector.

The connector may be movably positioned in the battery charger between an idle position for insertion of the hearing aid into the connector and a charging position for charging the rechargeable battery of the hearing aid.

The battery charger may further comprise a first latch mechanism for locking the connector in its charging position and a release actuator for releasing the first latch mechanism allowing the connector to move from the charging position to the idle position.

The battery charger may further comprise a second latch mechanism for locking the connector in its idle position, the second latch mechanism being released upon insertion of the hearing aid into the connector allowing the connector to move from the idle position to the charging position.

The connector may be pivotally mounted on a shaft in the battery charger.

The battery charger may further comprise a charging controller that is adapted for detection whether the battery in a hearing aid positioned in the charger and connected to the first electrical terminals is a rechargeable battery or a non-rechargeable battery.

The controller may be further adapted to control the power supply in such a way that the power supply does not supply power to a non-rechargeable battery.

The controller may further be adapted to detect whether a rechargeable battery in the hearing aid positioned in the charger in a position ready for charging is defect and further adapted to control the power supply in such a way that the power supply does not supply power to a defect battery.

The controller may further be adapted to supply a current to the rechargeable battery as a predetermined function of time in such a way that the battery is charged to its full capacity in a minimum amount of charging time. Typically, a rechargeable battery for a hearing aid requires 5-10 hours charging time for charging the battery to its full capacity. The charging is advantageously performed during night when the hearing aid user is sleeping and does not require the hearing aid.

Preferably, the battery charger is adapted for simultaneous charging of two batteries accommodated in two respective hearing aids positioned in two respective hearing aid connectors in the battery charger so that a hearing aid user requiring a hearing aid for both ears can recharge both hearing aid batteries without requiring two battery chargers.

The controller may further store various predetermined functions of charging current as a function of time for selection by the user. For example, one function may be available for charging of a rechargeable battery in a minimum amount of time, e.g. only partly to its full capacity, such as to 75% of its full capacity. Typically, a rechargeable battery for a hearing aid requires 1 or 2 hours to be charged to 75% of its capacity.

It is desirable for a hearing aid user to bring along extra batteries that are charged and ready for use, should the battery in the hearing aid be depleted during use. In this way, depletion of the battery in the hearing aid will not prevent the user for continuing his or her current activity. Therefore, the battery charger may advantageously be provided with one or more, preferably two, compartments for storing rechargeable batteries. Further, the battery charger is advantageously provided with second electrical terminals positioned for contacting each of the rechargeable batteries in the one or more compartments and connected to the power supply for charging the rechargeable batteries. Preferably, the second electrical terminals are positioned for operational connection with the respective batteries independent of their positional orientation in the compartment.

Preferably, the one or more compartments are positioned in a compartment member that is removably positioned in the battery charger, e.g. like a compartment member that the user can remove from the battery charger and carry along during the day. The compartment member may for example further be adapted for insertion into a key ring for ease of transportation and retrieval by the user.

Thus in a preferred embodiment, the battery charger is adapted for simultaneous recharging of four batteries, i.e. two batteries installed in two respective hearing aids and two extra batteries positioned in compartments adapted for this purpose in the battery charger.

The battery charger may have an indicator, such as a light emitting diode, for indication of a charging current being supplied to a rechargeable battery.

Further, the battery charger may have an indicator, such as a light emitting diode, for indication of the selected charging, e.g. a full charge, or a fast charge, of a rechargeable battery.

In accordance with some embodiments, a battery charger for charging a rechargeable battery which is located in a hearing aid, the battery charger includes a power supply for supplying a charging current to the rechargeable battery, a hearing aid connector for reception and accommodation of the hearing aid, the connector having a set of first electrical terminals connected with the power supply and positioned for connection with the rechargeable battery when the hearing aid is positioned in the connector, and an actuator that is adapted for providing access to the battery for connection with the first electrical terminals when the hearing aid is positioned in the connector.

DESCRIPTION OF DRAWING FIGURES

Figure 2:
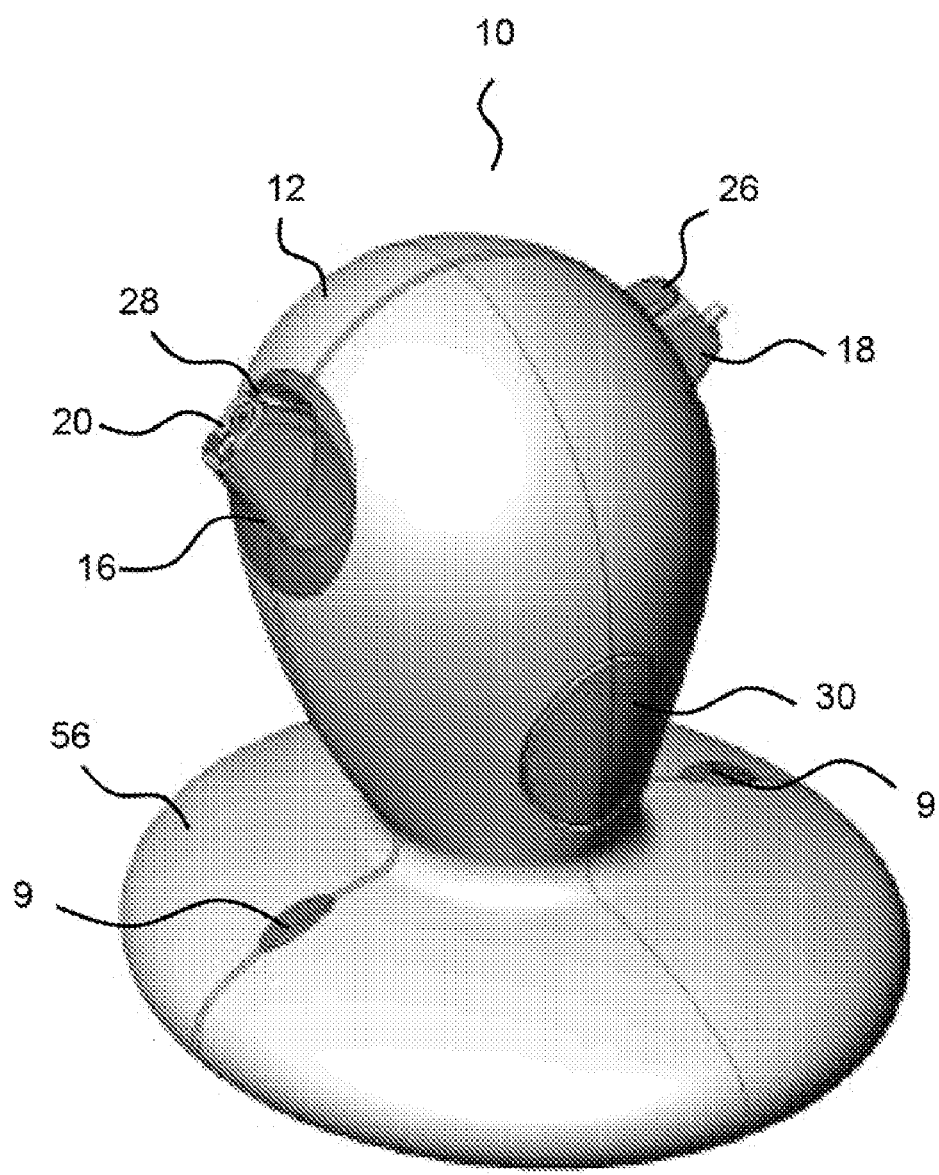
Figure 3:
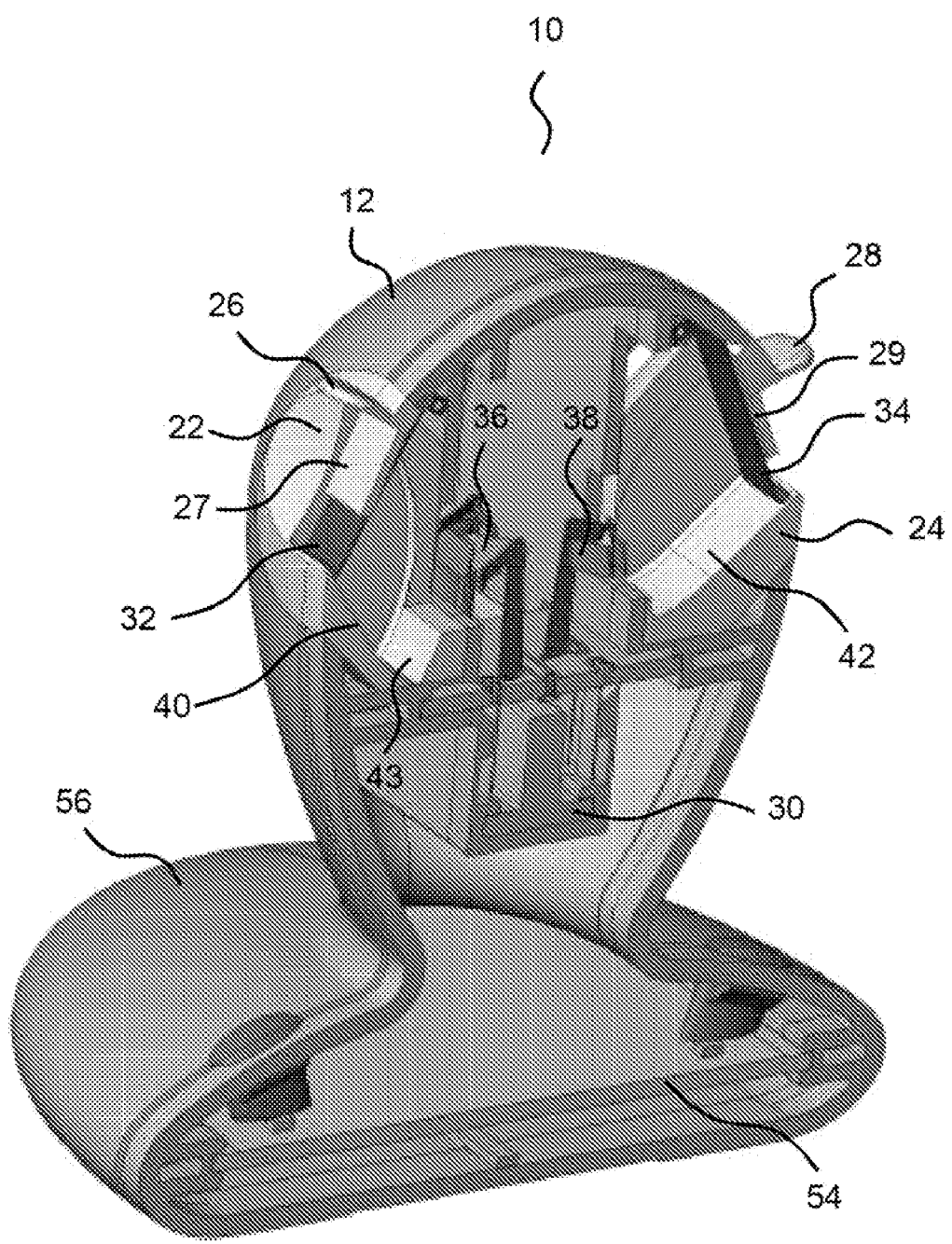
Figure 4:
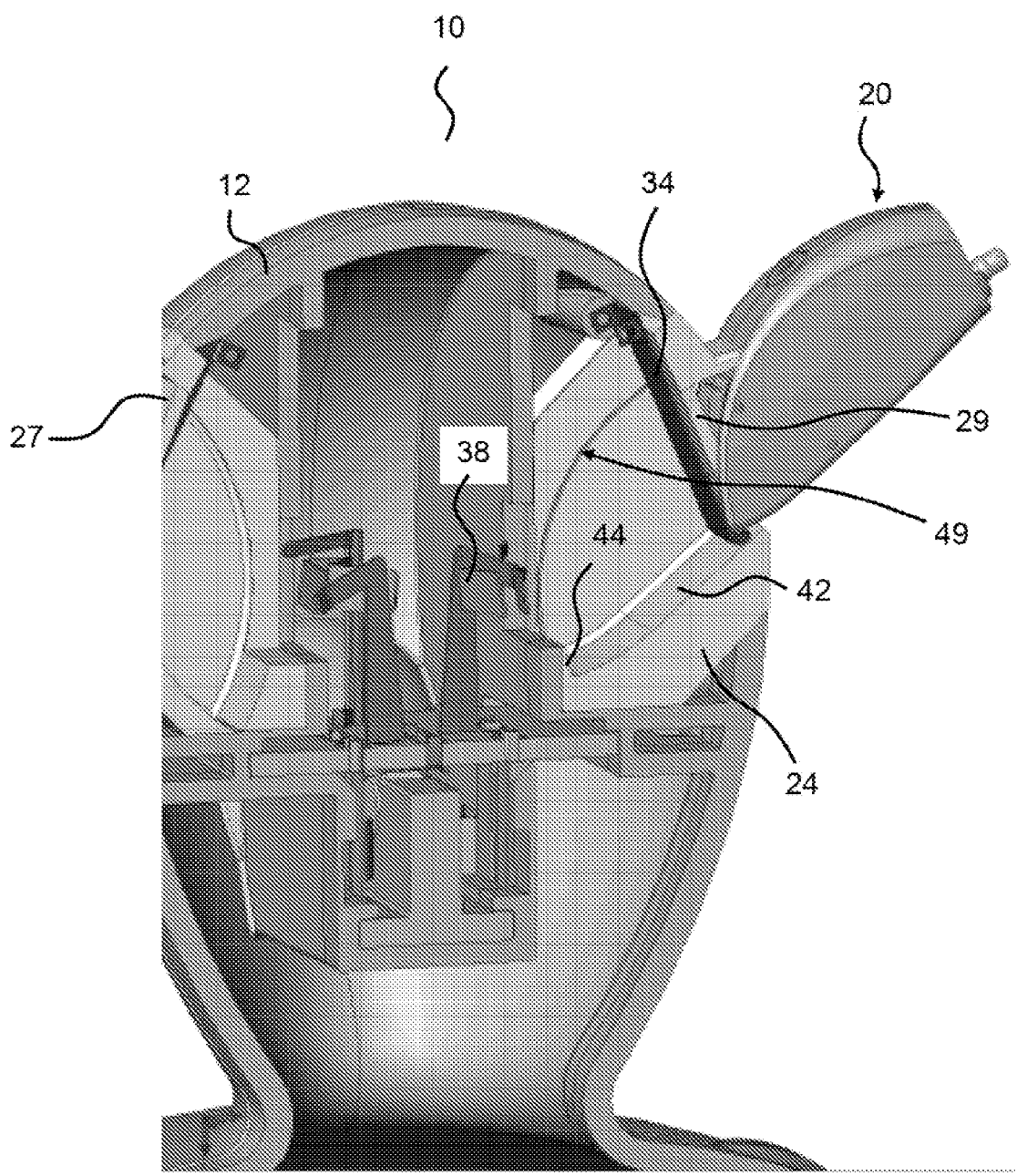
Figure 5:
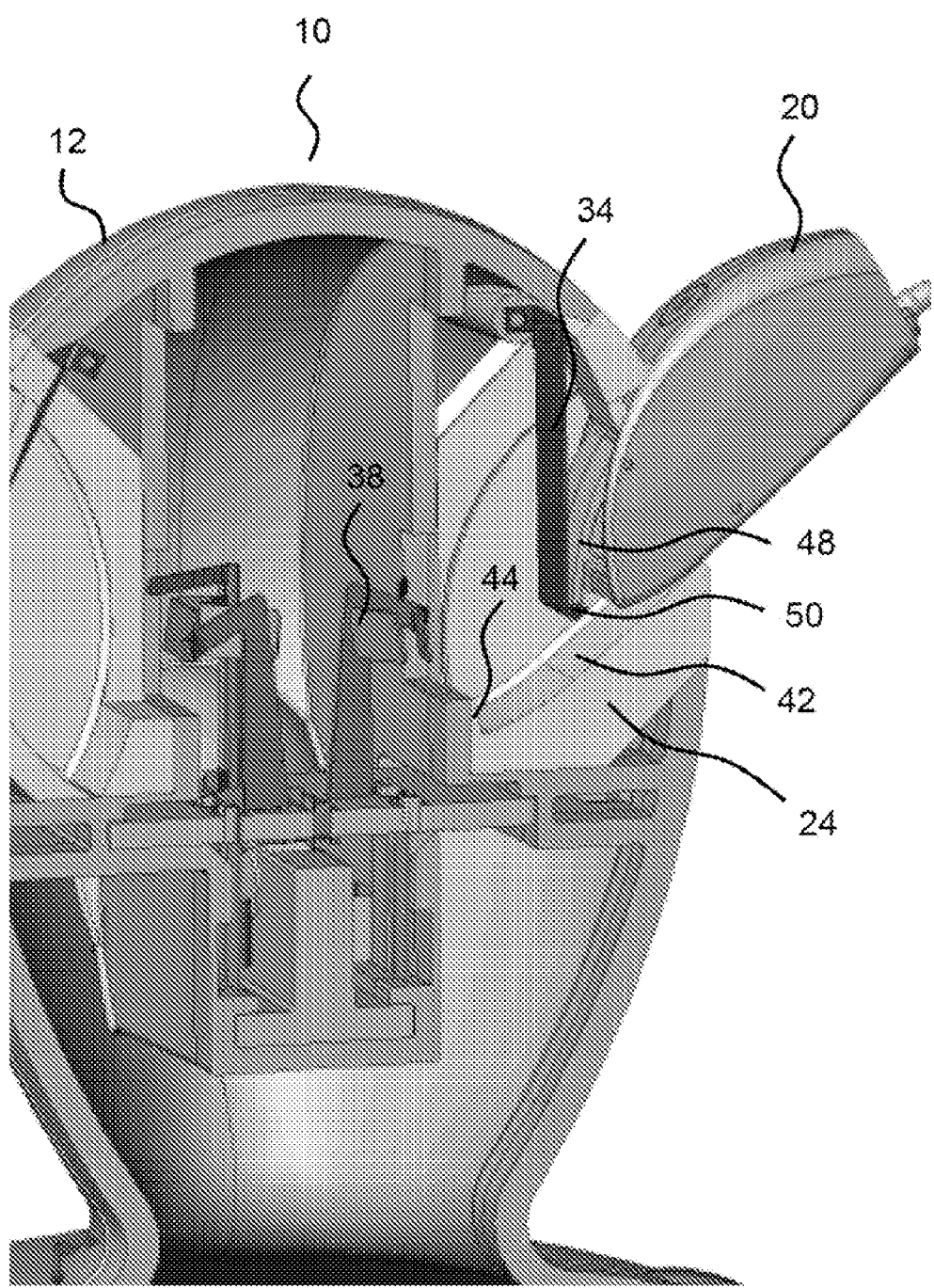
Figure 6:
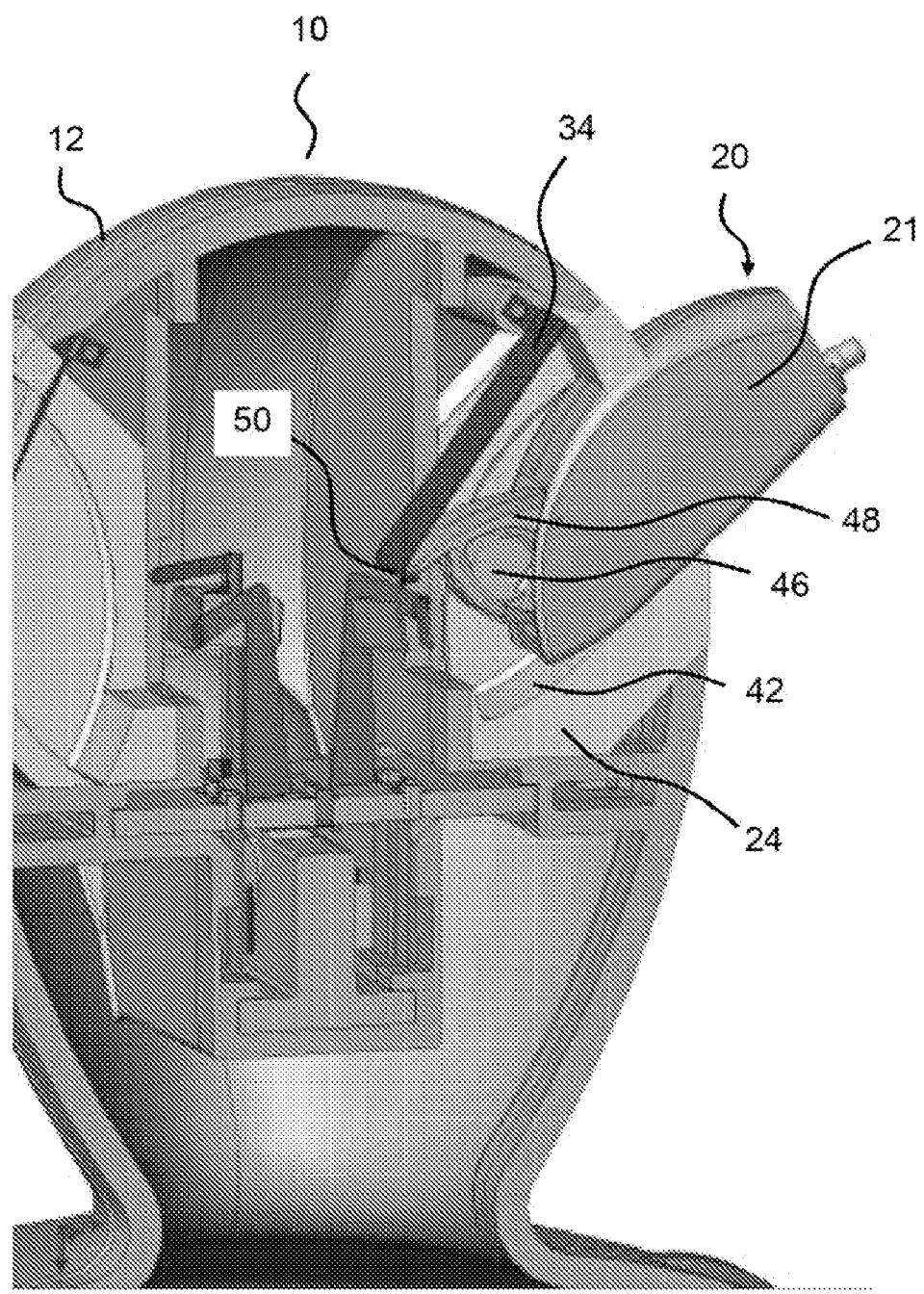
Figure 7:
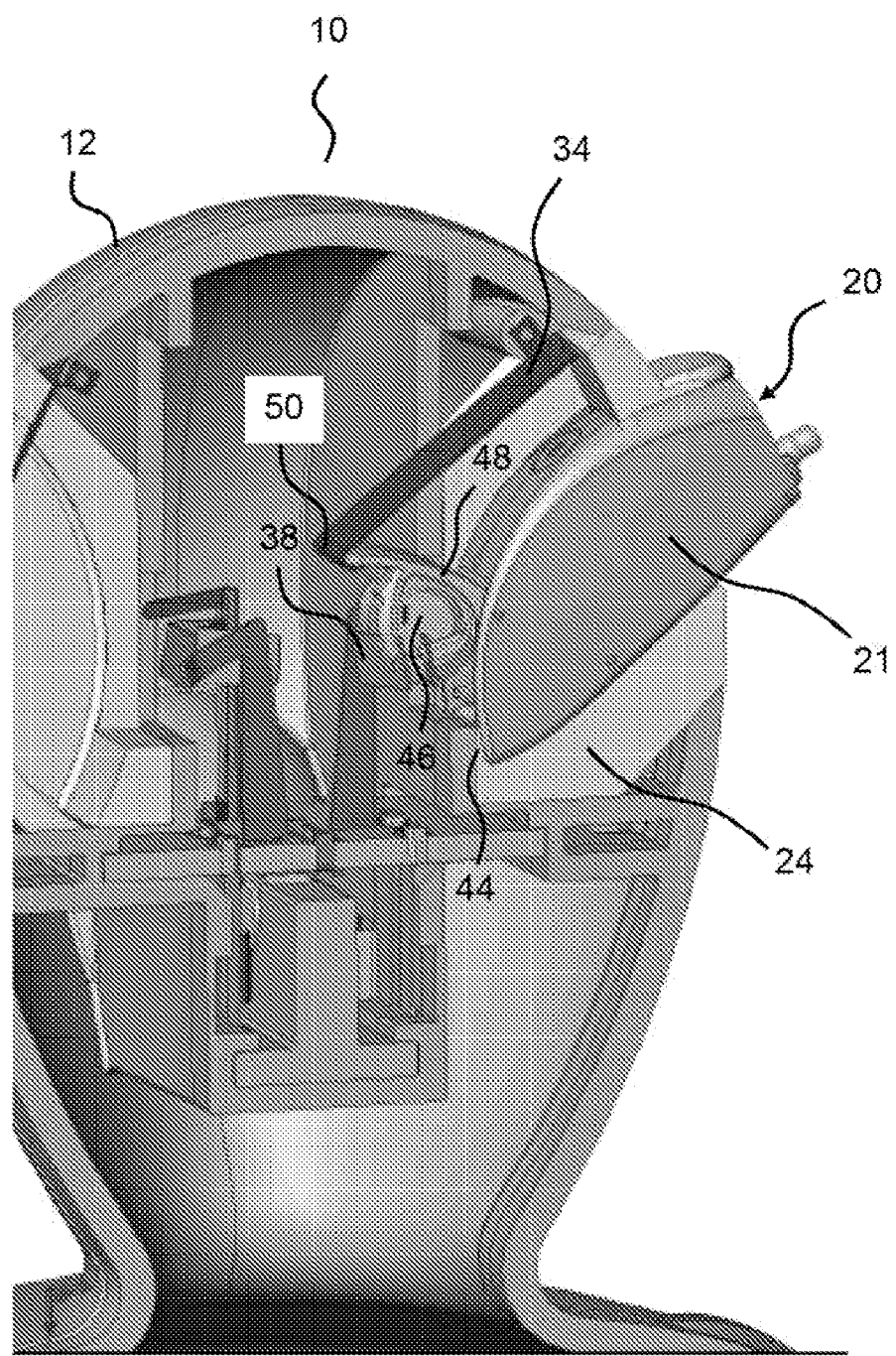
Figure 8:
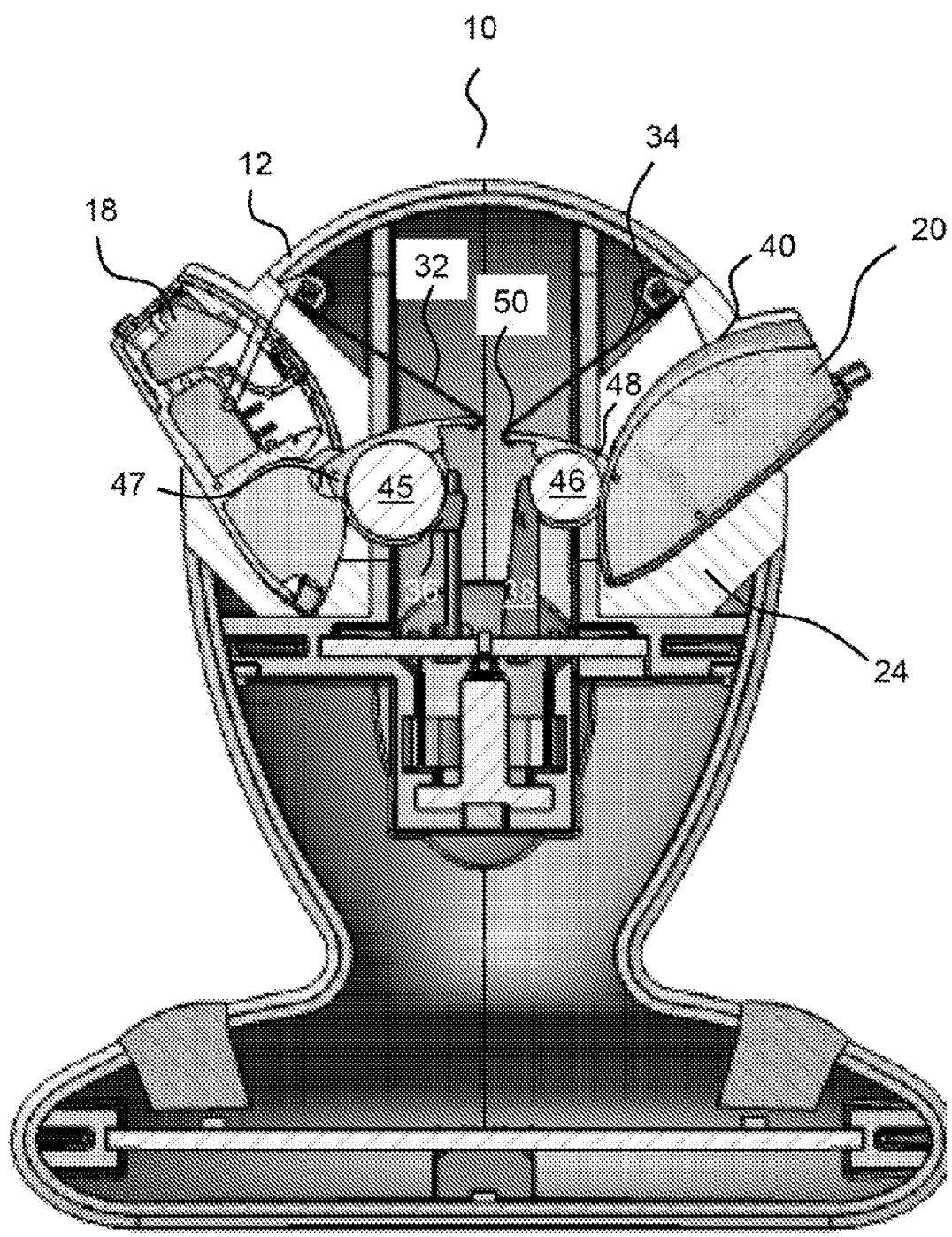
Figure 9:
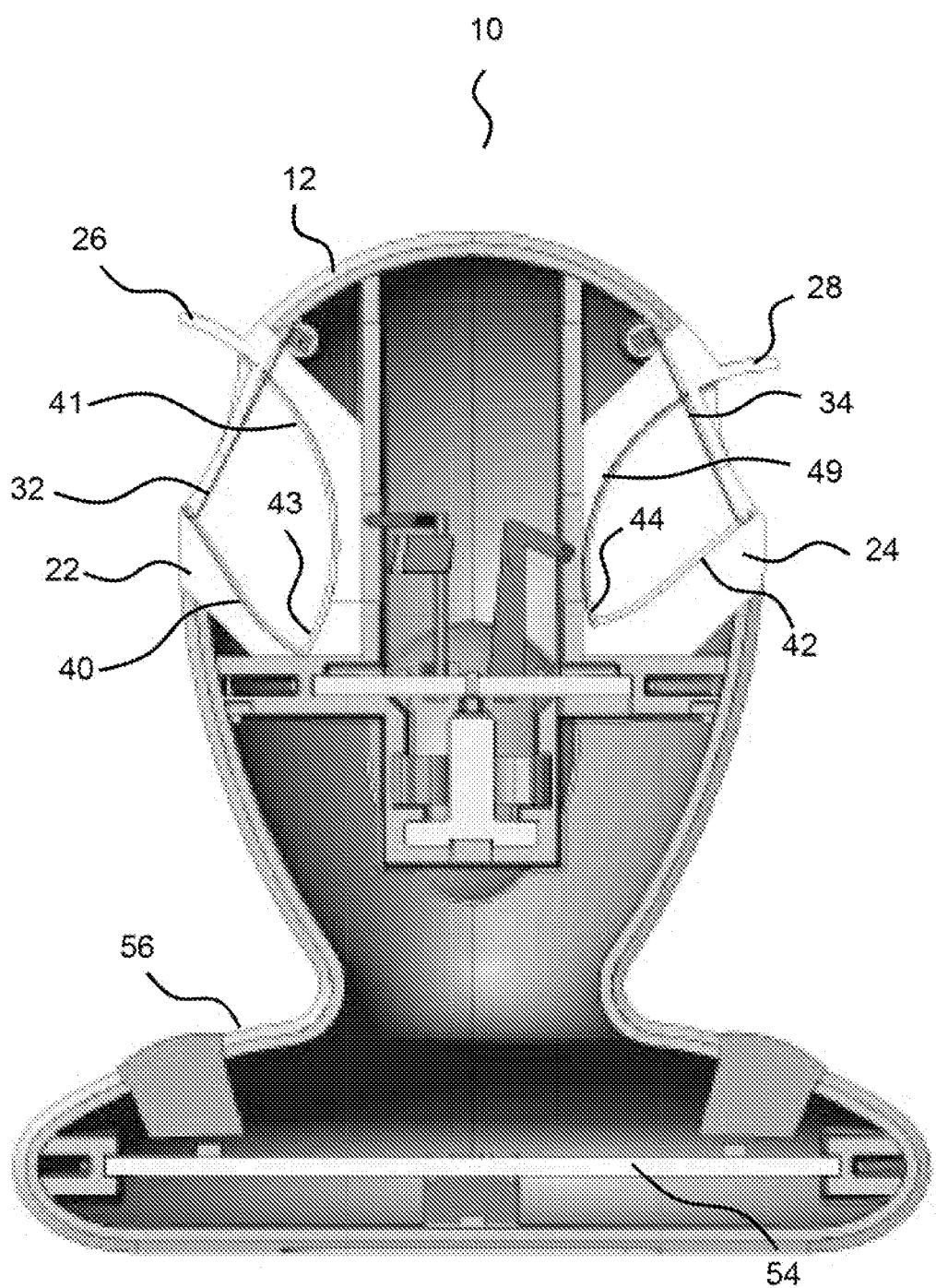
Figure 10:
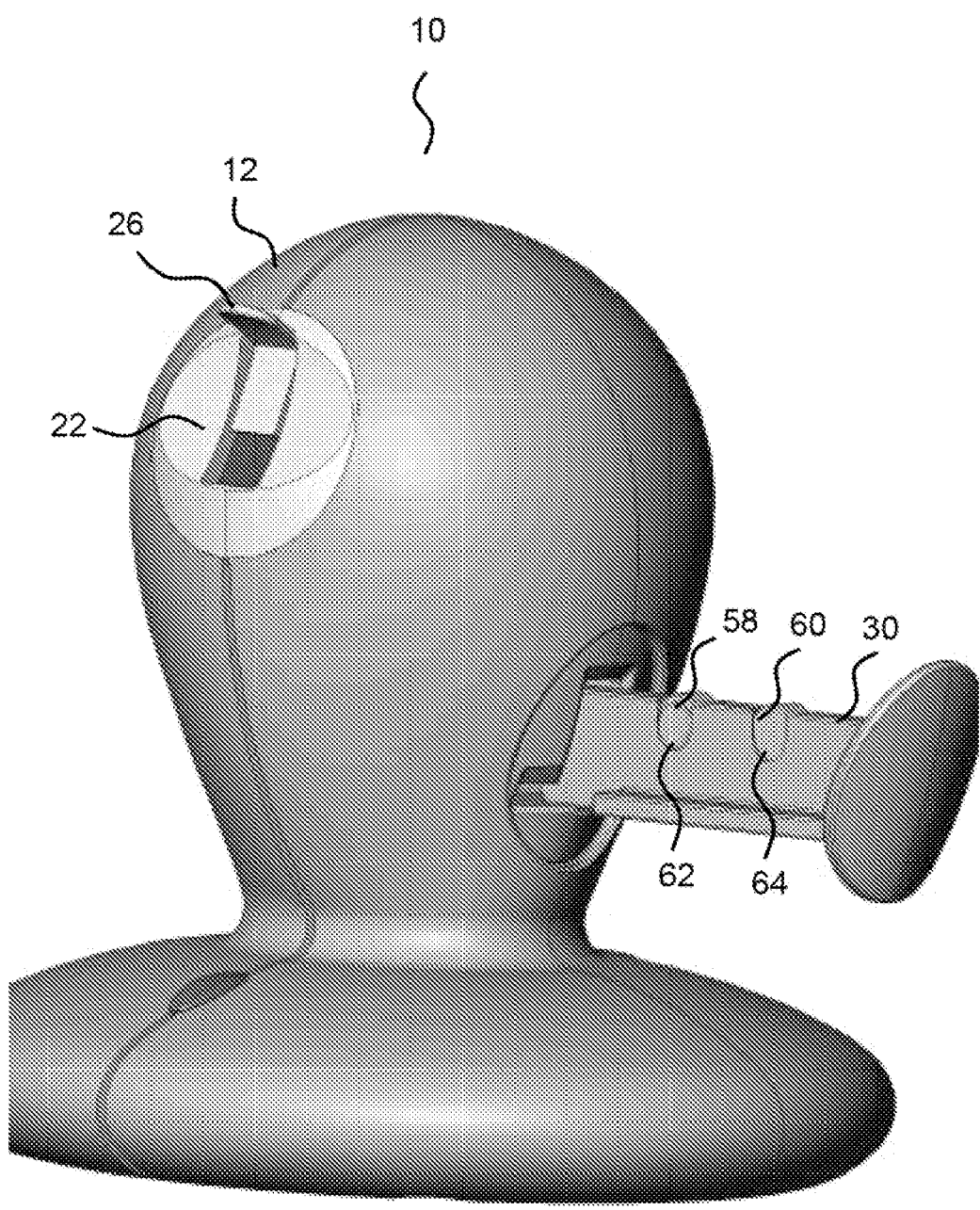
Figure 11:
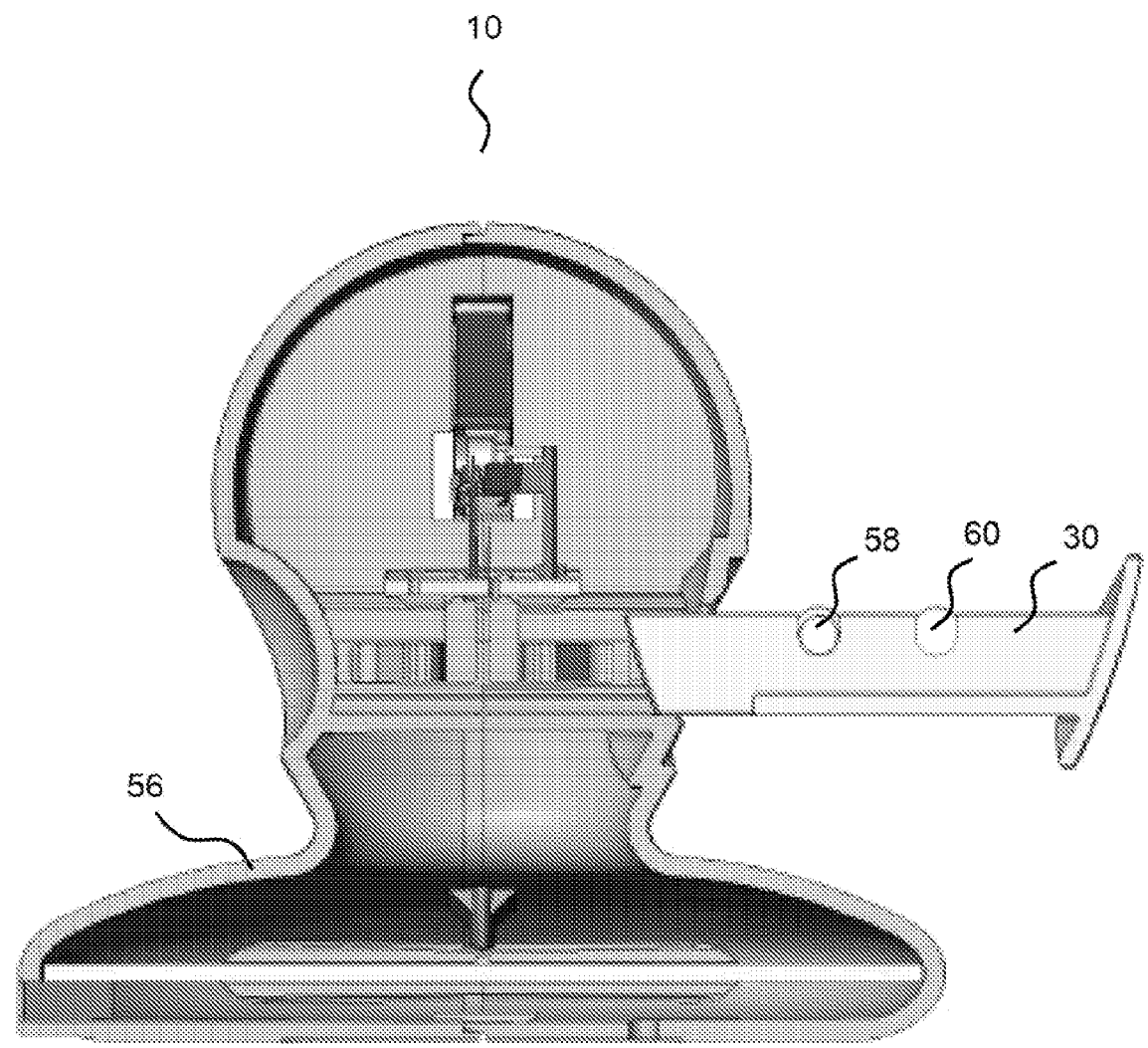
Figure 12:
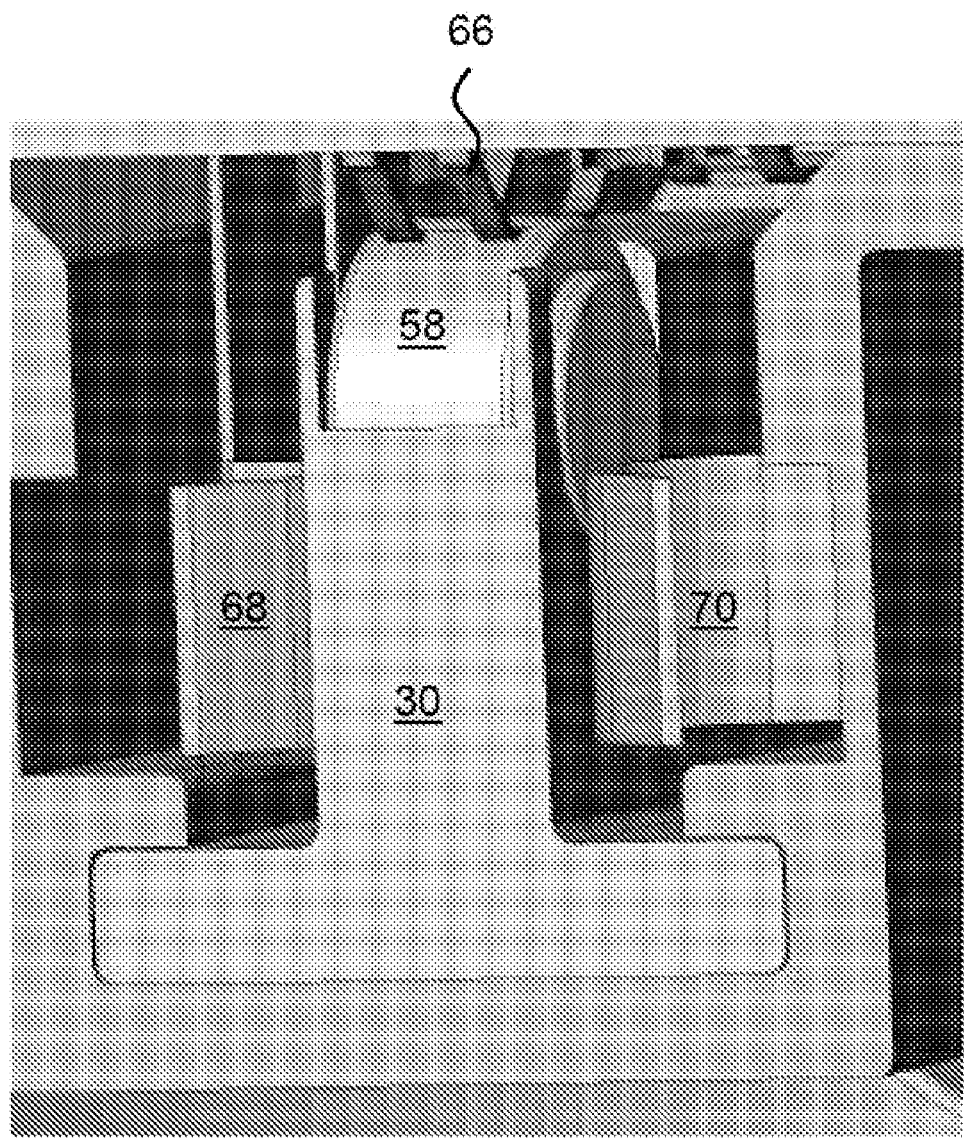
Figure 13:
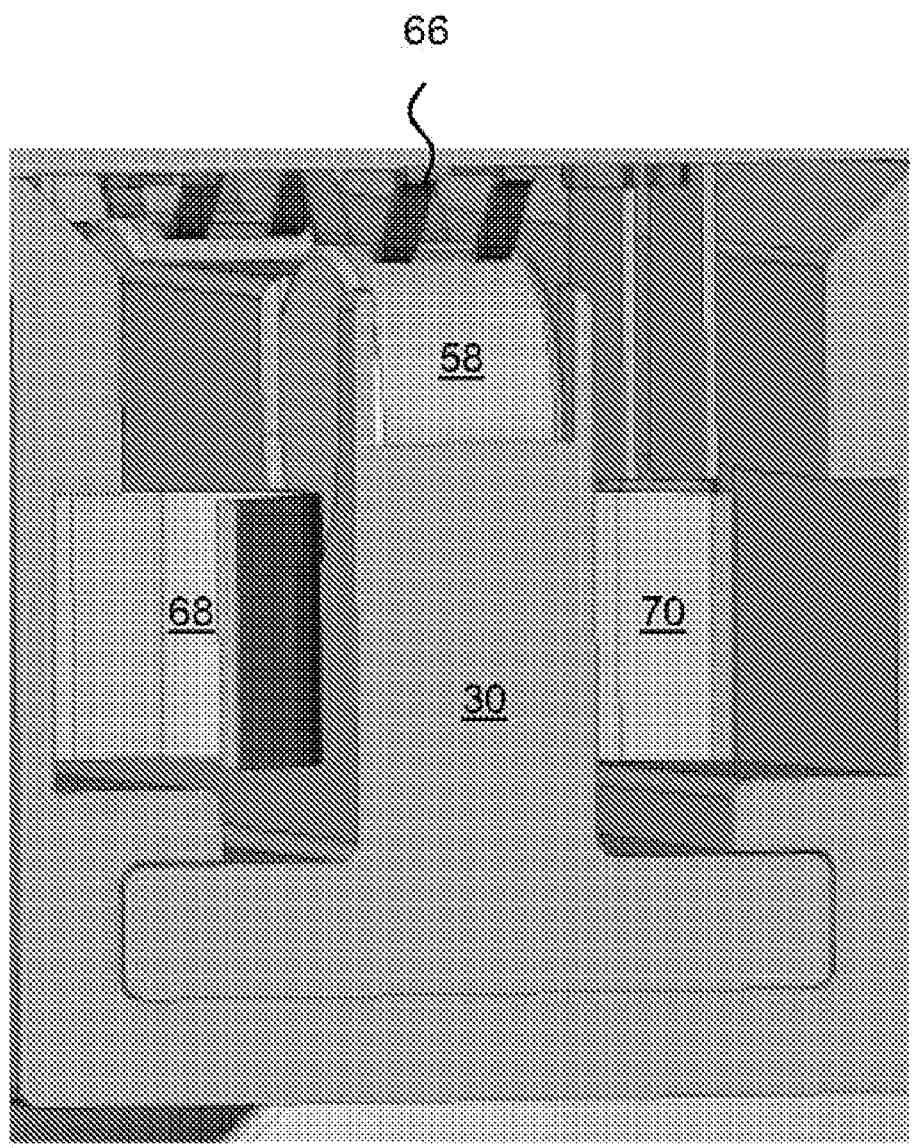
Figure 14:
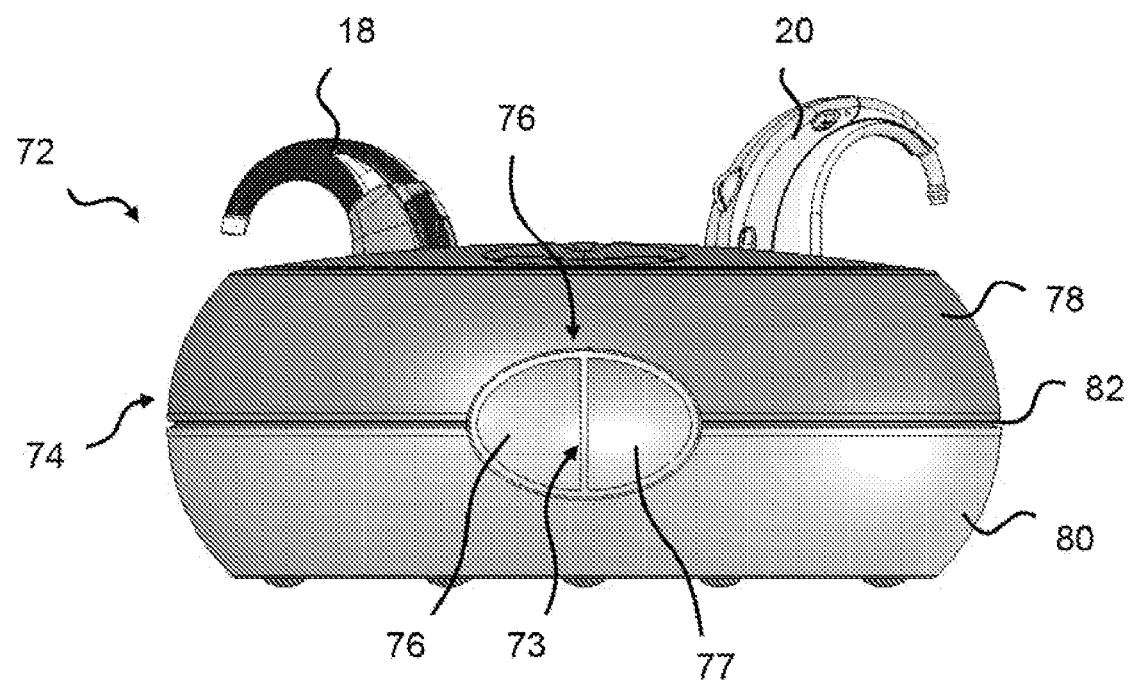
Figure 15:
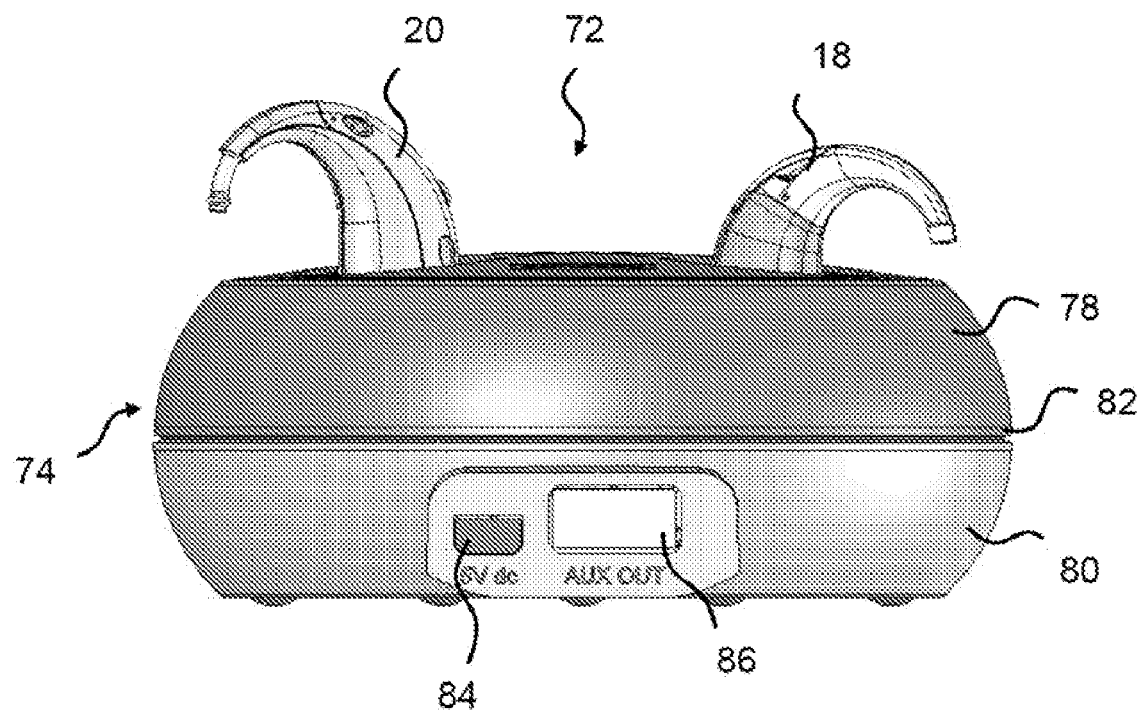
Figure 16:
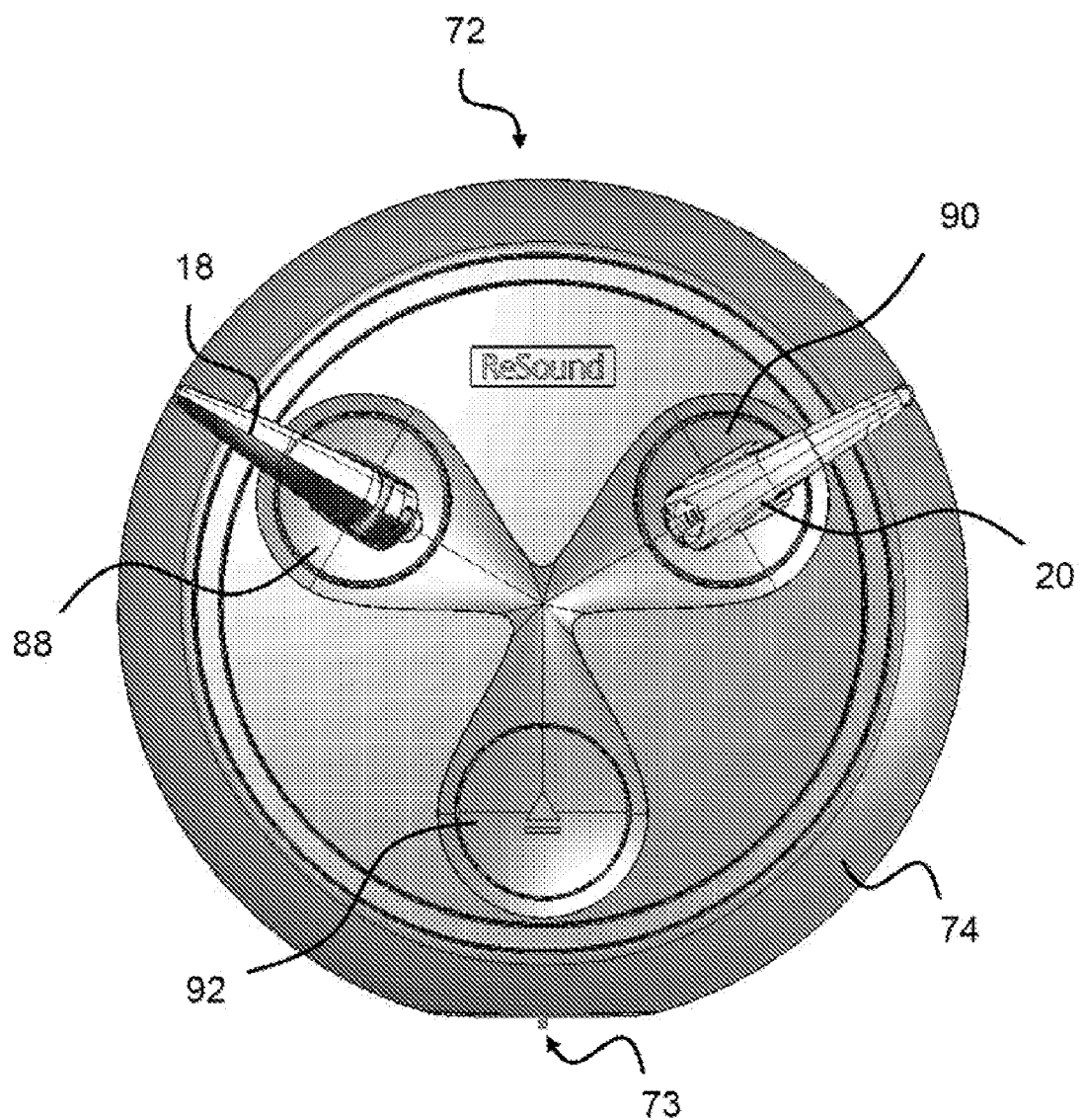
Figure 17:
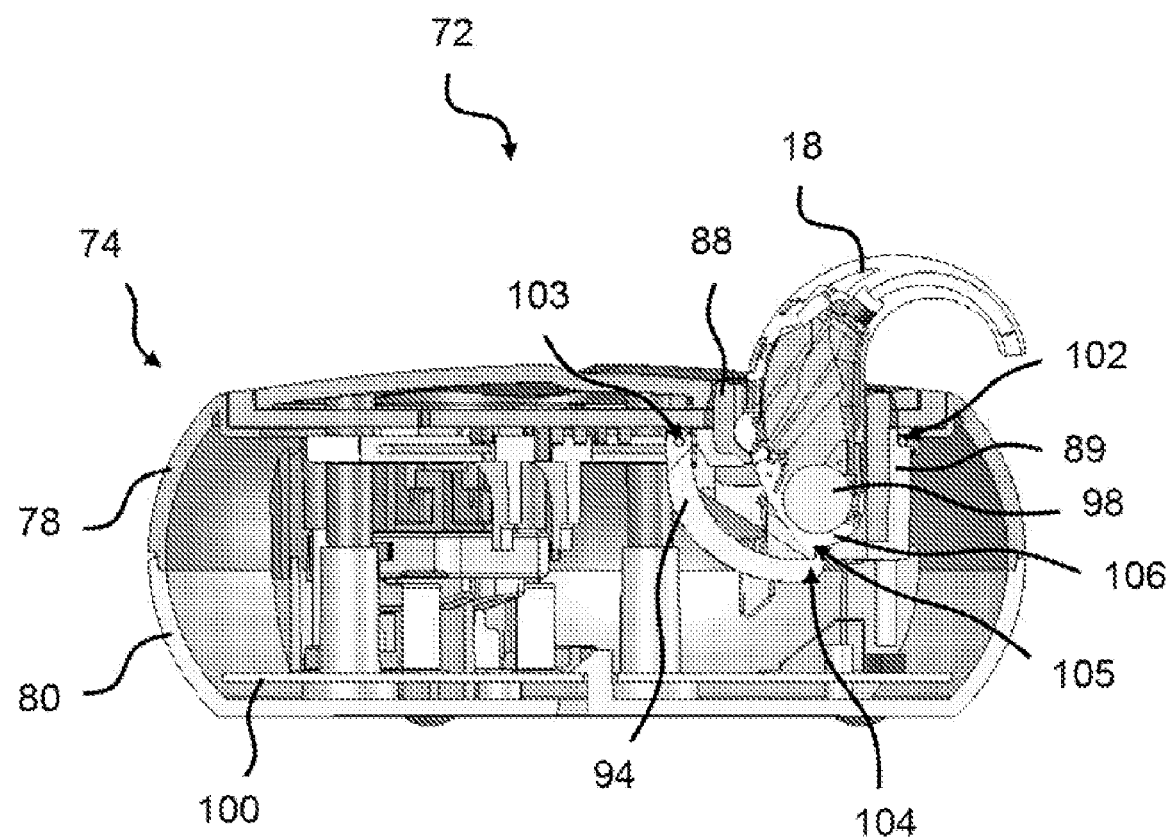
Figure 18:
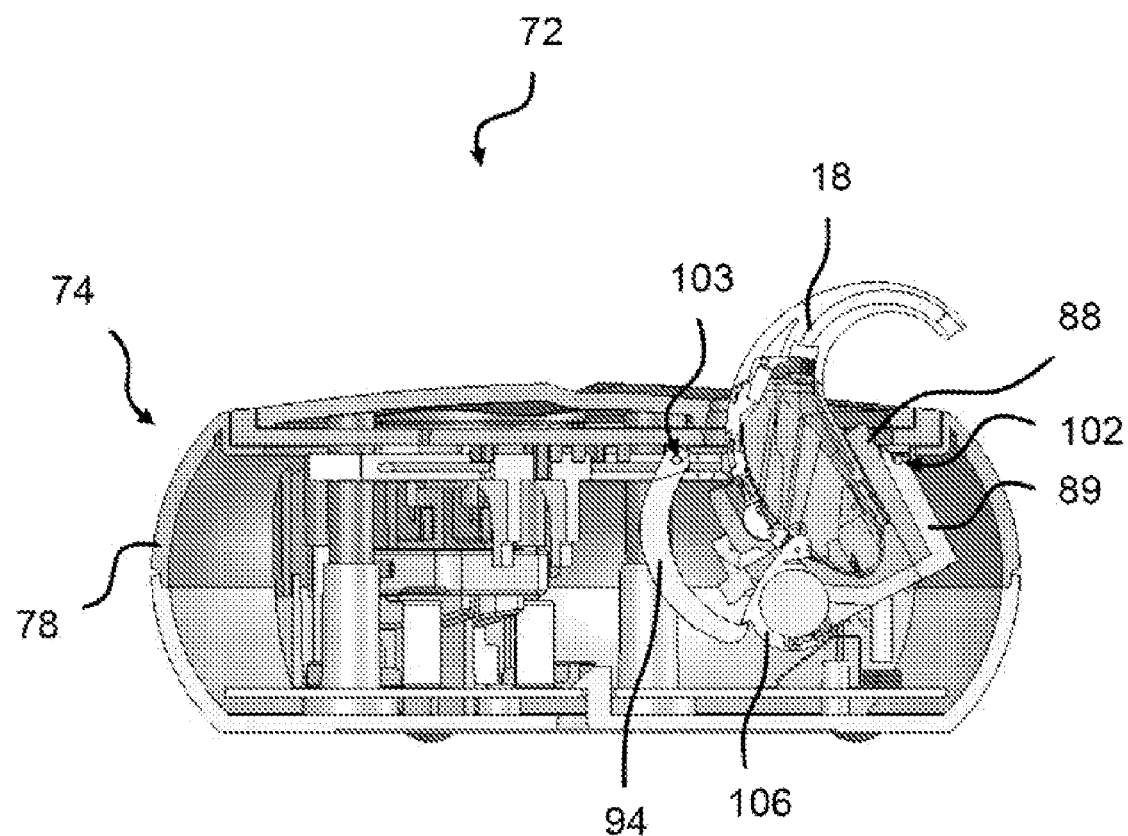
Figure 19:
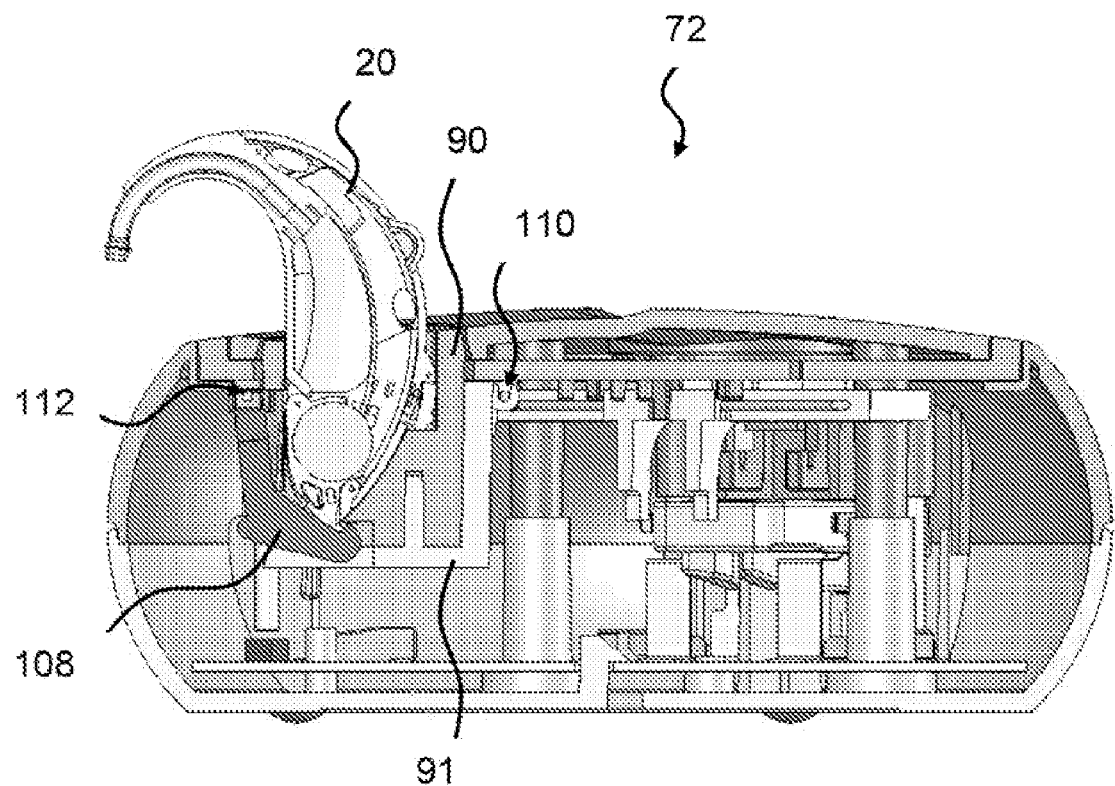
Figure 20:
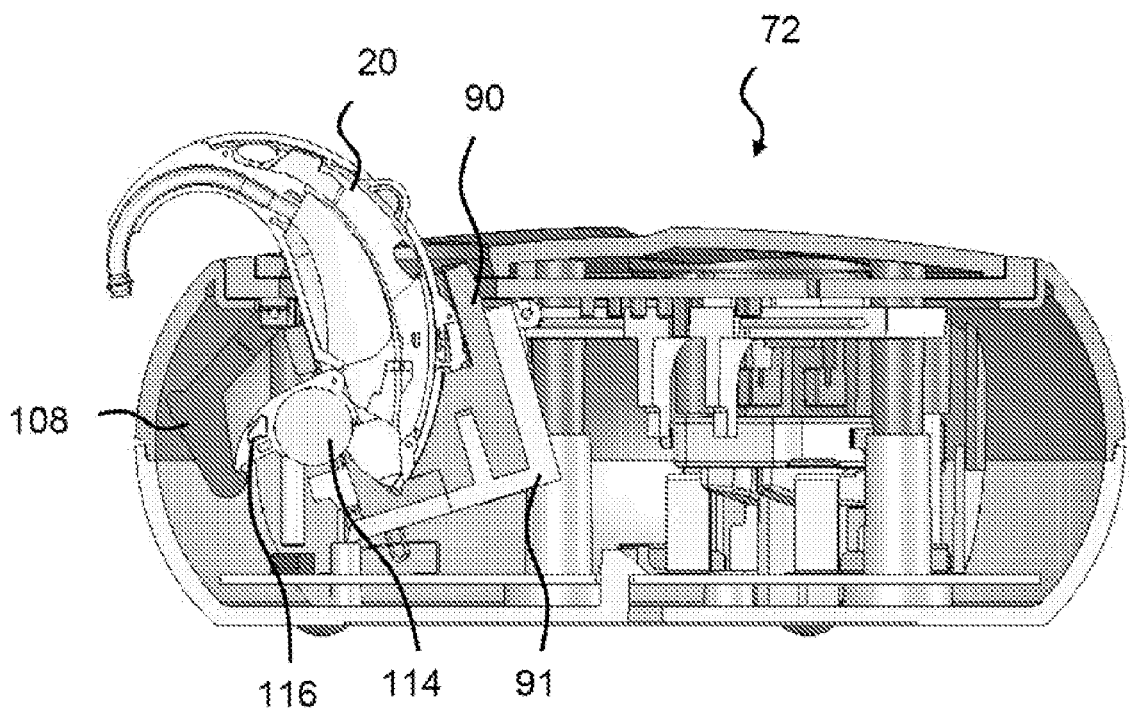
Figure 21:
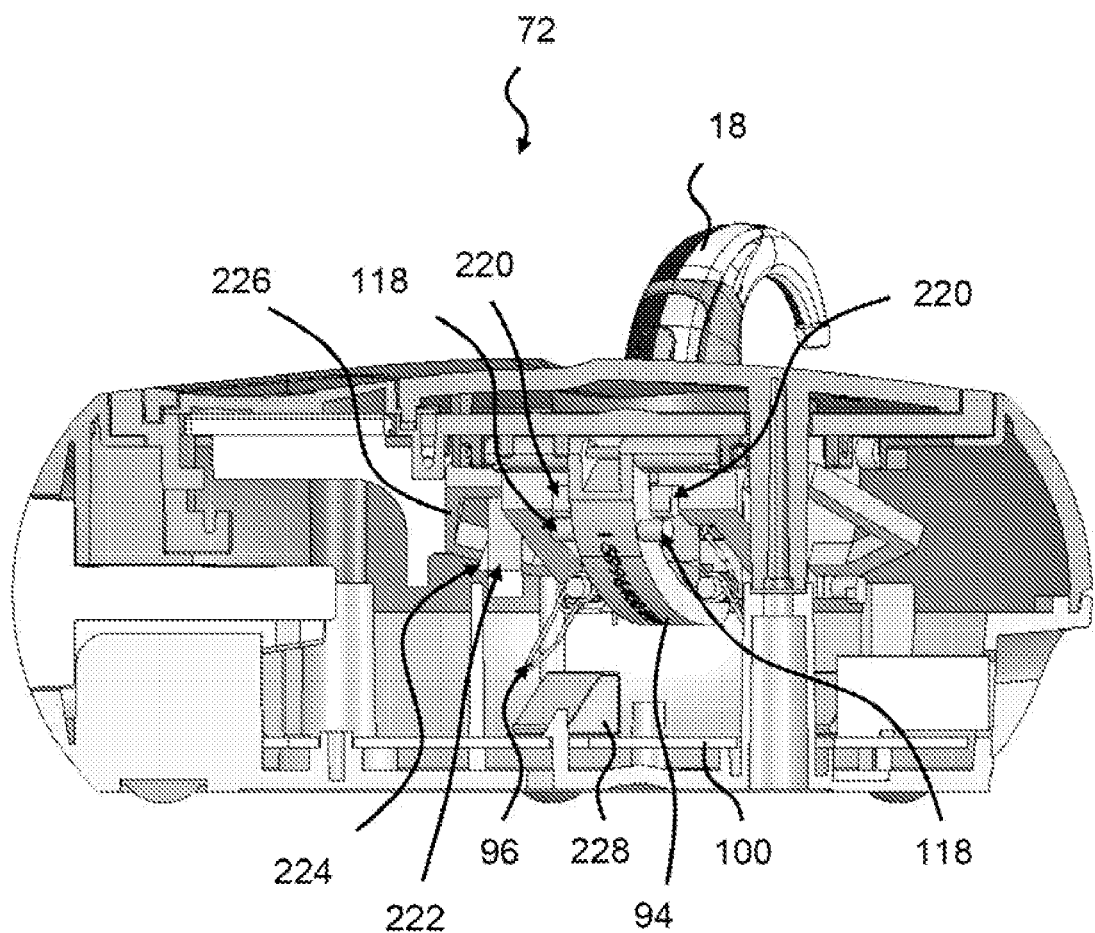
Figure 22:
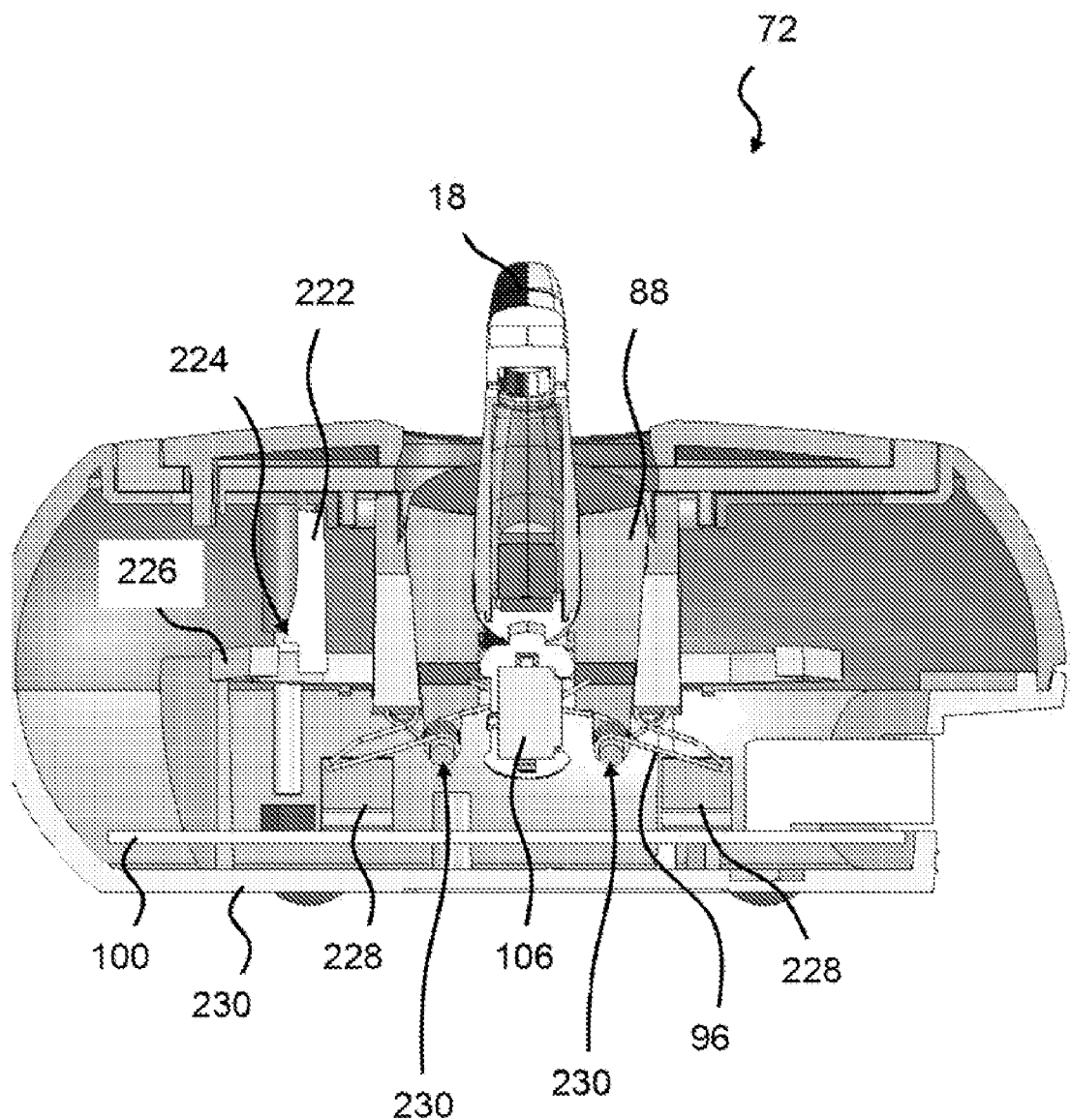
Figure 23:
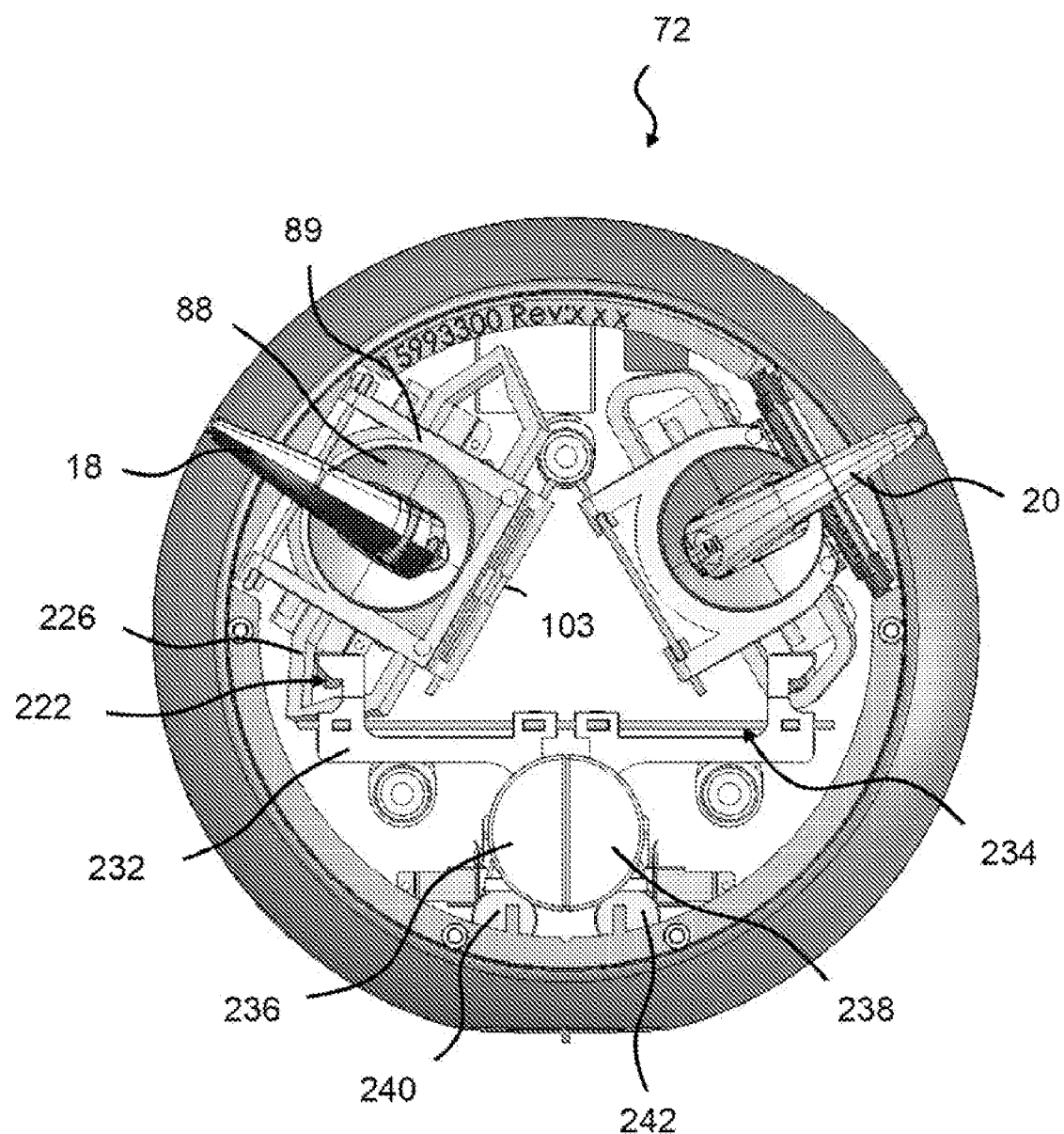

The above and other features and advantages of the embodiments will become more apparent to those of ordinary skill in the art by describing in detail exemplary embodiments thereof with reference to the attached drawings in which:

FIG. 1 is a perspective view of a preferred embodiment,

FIG. 2 is a perspective view of the embodiment shown in FIG. 1 with BTE hearing aids installed for charging, FIG. 3 shows a cross-section of the embodiment shown in FIG. 1, FIG. 4 illustrates insertion of a BTE hearing aid into the embodiment shown in FIG. 1, FIG. 5 illustrates insertion of a BTE hearing aid into the embodiment shown in FIG. 1, FIG. 6 illustrates insertion of a BTE hearing aid into the embodiment shown in FIG. 1, FIG. 7 shows the cross-section of FIG. 3 with a BTE hearing aid installed in a position ready for charging of its rechargeable battery, FIG. 8 shows the cross-section of FIG. 3 with two BTE hearing aids installed in a position ready for charging of its rechargeable batteries, FIG. 9 shows the cross-section of FIG. 8 with the removable members, FIG. 10 shows an embodiment with a compartment member for accommodation and charging of extra batteries, FIG. 11 shows a cross-section of the embodiment of FIG. 10, FIG. 12 shows the compartment member of FIGS. 10 and 11 in its position for charging of the extra batteries, FIG. 13 shows the compartment member of FIG. 12 from a different angle, FIG. 14 shows a side view of an alternative embodiment of a charger, FIG. 15 shows another side view of the embodiment illustrated in FIG. 14, FIG. 16 shows a top view of a the embodiment of a charger illustrated in FIG. 14, FIG. 17 illustrates insertion of a BTE hearing aid into the embodiment shown in FIG. 14, FIG. 18 illustrates insertion of a BTE hearing aid into the embodiment shown in FIG. 14, FIG. 19 illustrates insertion of a BTE hearing aid into the embodiment shown in FIG. 14, FIG. 20 illustrates insertion of a BTE hearing aid into the embodiment shown in FIG. 14, FIG. 21 shows a cross-section of the charger illustrated in FIG. 14 with a BTE hearing aid installed in the idle position, FIG. 22 shows the cross-section of FIG. 21 with a BTE hearing aid installed in the charging position ready for charging of its rechargeable battery, and FIG. 23 illustrates a semitransparent top view of the embodiment of the charger illustrated in FIG. 14.

DETAIL DESCRIPTION OF EMBODIMENTS

The embodiments will now be described more fully hereinafter with reference to the accompanying drawings. The embodiments may, however, be embodied in different forms and should not be construed as limited to the embodiments set forth herein. Rather, these embodiments are provided so that this disclosure will be thorough and complete, and will fully convey the scope of the application to those skilled in the art. Like reference numerals refer to like elements throughout. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 shows in perspective a battery charger 10 according to some embodiments. The housing 12 encloses a power supply (not visible) for supplying a charging current to rechargeable batteries, and two hearing aid connectors comprising removable parts 22, 24 for reception and accommodation of hearing aids. The housing 12 has two openings 14, 16 for insertion of two BTE hearing aids 18, 20 as shown in FIG. 2 into the housing 12 for support by the removable parts 22, 24 of the hearing aid connectors. The openings 14, 16 may be positioned in respective removable parts 22, 24 of the connectors facilitating cleaning or substitution with a new part for hygienic reasons. Each of the removable parts 22, 24 of the connectors has a handle 26, 28 for easy grip between two fingers for removal from or insertion into the housing 12. Each of the removable parts 22, 24 of the connectors also has guide walls (not visible) positioned in relation to the respective opening 14, 16 for guiding a hearing aid towards the respective set of first electrical terminals (not visible) of the battery charger 10 during insertion of the hearing aid 18, 20 into the battery charger 10. The removable parts 22, 24 are made of a soft silicone and may be cleaned in a dish washing machine.

A compartment member 30 with two compartments (not visible) for accommodation of rechargeable batteries is removably positioned in the battery charger 10. The user can remove the compartment member 30 from the battery charger 10 and in this way bring two fully recharged batteries along during the day. The compartment member 30 may for example further be adapted for insertion into a key ring for ease of transportation and retrieval by the user. When the compartment member 30 has been removed from the battery charger and inserted into the key ring, batteries in the compartment member 30 may be discharged. Thus, the key ring may comprise an indicator, such as light emitting diodes, for indicating the battery status of the batteries so that the user may establish whether the batteries need to be recharged.

As shown in FIG. 1, there is a recess 25 in the housing 12 of the battery charger 10 so that the user can push the compartment member 30 a distance out of the housing 12 by pushing the end of the compartment member 30 shown in FIG. 1 so that the other end of the compartment member 30 shown in FIG. 2 can be pulled out of the housing 12, e.g. into the position shown in FIGS. 10 and 11.

The battery charger 10 is provided with second electrical terminals positioned for contacting each of the rechargeable batteries in the two compartments and connected to the power supply for charging the rechargeable batteries in the compartments. The second electrical terminals are positioned for operational connection with the respective batteries independent of their positional orientation as described in more detail below with reference to FIGS. 12 and 13.

Thus, in the illustrated embodiment, the battery charger 10 is adapted for simultaneous recharging of four batteries, i.e. two batteries installed in two respective BTE hearing aids 18, 20 and two extra batteries 58, 60 positioned in compartments 62, 64 in the compartment member 30 in the battery charger 10.

The illustrated charger 10 also comprises a set of visual indicators, such as light emitting diodes 9. The light emitting diodes may for example be adapted to indicate charger status, i.e. whether the charger is charging the batteries (not visible) of a hearing aid 18, 20 and whether it has finished charging the batteries (not visible). Visual indicators may be provided for indicating the charging status of the rechargeable batteries (not visible) to be charged.

The illustrated battery charger 10 also has a connector 31 for connection with a computer for power supply of the charger 10. The connector 31 may be a USB connector in which case the power supply of the charger 10 is adapted to operate from the 5 V supply voltage output by the computer through its USB connector. Presently, every computer is equipped with one or more USB connectors making power supply for the illustrated battery charger 10 readily available.

FIG. 3 shows a vertical cross-section of the battery charger 10 shown in FIGS. 1 and 2, in which the actuators 32, 34 and the first electrical terminals 36, 38 are also visible. The actuators 32, 34 are provided for accessing a battery in a hearing aid making the battery available for connection with the first electrical terminals 36, 38 when the hearing aid 18, 20 is positioned in the removable part 22, 24 of the connector. The first electrical terminals 36, 38 are connected with the power supply and positioned for connection with the respective rechargeable battery when the hearing aid 18, 20 is positioned in the removable part 22, 24 of the connector.

The battery charger 10 further comprises closing members 27, 29 for partly closing the battery cover 47, 48 of the hearing aid 18, 20 during removal of the hearing aid 18, 20 from the battery charger 10. The closing member 27, 29 is positioned in relation to the respective opening 14, 16 and guide member 40, 42 in such a way that it pushes the battery cover 47, 48 into a partly closed position during removal of the hearing aid 18, 20 from the battery charger 10 so that the battery cover 47, 48 of the hearing aid 18, 20 is partly but not fully closed upon removal from the battery charger 10. The partly closure of the battery cover 47, 48 ensures that the battery does not inadvertently fall out of its compartment in the hearing aid housing 21 and also allows the user to turn the hearing aid 18, 20 on at a later time in the event that the hearing aid 18, 20 is not needed immediately after charging.

The function of the actuators 32, 34 is further illustrated in FIGS. 4-7 illustrating step by step the insertion of a BTE hearing aid 20 into the opening 14 of the battery charger 10 guided by guiding walls 42, 49 in the removable part 22 towards an end wall 44 in the removable part 22. As shown in FIG. 7, a rechargeable battery 46 is accommodated in the BTE hearing aid housing 21 in a compartment formed by a support structure that allows access to the battery poles for power supply of the hearing aid circuitry by the battery 46 and that includes a battery door 48 that can be opened by the user allowing the user to access and exchange batteries. The battery door 48 is hinged to the hearing aid housing 21 so that it swings open thereby withdrawing the battery 46 from the hearing aid housing 21. The hearing aid 20 is turned off when the door 48 is opened, and the hearing aid 20 is turned on when the door 48 is fully closed.

As shown in FIGS. 4-7, the actuator 32 has an end flange 50 for engagement with the non-hinged end 52 of the battery door 48 in a way similar to the opening of the battery door 48 using a fingernail. When the BTE hearing aid 20 has been fully inserted into the battery charger 10 in abutting relation with the end member 44, the first electrical terminals 38 are simultaneously brought into electrical contact with the poles of the battery 46, i.e. one terminal is in electrical contact with the circular peripheral surface of the battery 46 and the other terminal is in electrical contact with the plane surface of the other battery pole.

In this way, the user is not required to perform any handling of the hearing aid battery 46 in order to recharge the battery 46. When the user inserts a hearing aid 20 into the battery charger 10, the door 48 to the battery compartment is automatically opened whereby the hearing aid 20 is turned off and access is provided for the first electrical terminals 38 of the battery charger 10 to the battery poles so that the power supply may recharge the battery 46. The fact that the hearing aid 20 is automatically turned off in the battery charger 10 prevents the hearing aid 20 from emitting sounds during charging and eliminates power consumption of the hearing aid circuitry during charging so that the duration of charging is minimized.

When the user removes the hearing aid 20 from the battery charger 10, the battery door 48 of the hearing aid 10 is partly and not fully closed. The partly closure of the battery door 48 ensures that the battery 46 does not inadvertently fall out of its compartment in the hearing aid housing 21 and also allows the user to turn the hearing aid 20 on at a later time, should the hearing aid 20 not be needed immediately after charging.

FIG. 8 shows a cross-section of the battery charger 10 with two BTE hearing aids 18, 20 fully inserted and ready for charging of their batteries 45, 46, the actuators 32, 34 holding the battery doors 47, 48 in an open position wherein the battery poles are in electrical contact with the first electrical terminals 36, 38. It should be noted that in the illustrated embodiment, the battery 45 to the left is larger than the battery 46 to the right and that different sized batteries are accommodated in the battery charger 10 by varying the angle of insertion of the hearing aid 18, 20. Therefore, the angle of the hearing aid 18 to the left is steeper than the angle of the hearing aid 20 to the right so that the centres of the respective batteries 45, 46 are positioned in substantially the same position with relation to their respective first electrical terminals 36, 38. In this way, batteries 45, 46 of various sizes may be accommodated in the same battery charger 10 by fitting a respective removable part 22, 24 in the battery charger with the appropriate geometry of guiding and end walls for bringing the battery 45, 46 in question into correct operational position with relation to the first electrical terminals 36, 38.

In this way, the charger housing 12 may accommodate batteries 45, 46 of various sizes by insertion of respective removable connector parts 22, 24 with the appropriate geometry and dimensions for the battery sizes in question without making changes to other parts of the battery charger 10.

FIG. 9 shows the cross-section of FIG. 8 without hearing aids in the removable parts 22, 24 of the connectors so that the guiding walls 40, 41, 42, 49 and end walls 43, 44, forms at least in part guide members and end walls 44, 45 of the removable part 22, 24 of the connector. Also, preferably the handles 26, 28 forms a part of the guide members of the removable part 22, 24 of the connector.

The printed circuit board 54 in the base part 56 of the battery charger 10 holds the power supply supplying the charging current to the rechargeable batteries (45, 46, 58, 60). The printed circuit board 54 further holds a charging controller that is adapted for detection whether the battery in a hearing aid positioned in the charger 10 and connected to the first electrical terminals (36, 38) is a rechargeable battery or a non-rechargeable battery by determination of the output impedance of the battery. The controller prevents the power supply from supplying power to a non-rechargeable battery.

The controller further detects whether a rechargeable battery in a hearing aid 18, 20 positioned in the charger 10 in a position ready for charging is defect by determination of the output impedance of the battery. The controller prevents the power supply from supplying power to a defect battery.

The controller is adapted to supply a current to the rechargeable battery as a predetermined function of time in such a way that the battery is charged to its full capacity in a minimum amount of charging time. Typically, a rechargeable battery for a hearing aid requires 5-10 hours charging time for charging the battery to its full capacity. The charging is advantageously performed during night when the hearing aid user is sleeping and does not require the hearing aid.

The controller stores various predetermined functions of charging current as a function of time for selection by the user. For example, one function is available for charging of a rechargeable battery in a minimum amount of time, e.g. only partly to its full capacity, such as to 75% of its full capacity. Typically, a rechargeable battery for a hearing aid requires 1 or 2 hours to be charged to 75% of its capacity.

It is desirable for a hearing aid user to bring along extra batteries that are charged and ready for use, should the battery in the hearing aid be depleted during use. In this way, depletion of the battery in the hearing aid will not prevent the user for continuing his or her current activity.

FIG. 10 shows the battery charger 10 with the compartment member 30 pulled out into a position for possible removal of the extra batteries 58, 60 from their respective compartments 62, 64.

FIG. 11 shows a cross-section of the embodiment of FIG. 10. It should be noted that batteries 58, 60 are mounted in their respective compartments 62, 64 with their poles pointing in opposite directions.

FIGS. 12 and 13 show in more detail the relative positioning of the battery poles in relation to the respective second electrical terminals 66, 68, 70 when the compartment member 30 is fully inserted into the battery charger in its position for charging of the extra batteries 58, 60. FIG. 12 shows how the plus terminal 66 of the power supply engages with the circular periphery of the battery 58 for electrical connection of the plus pole of the battery 58 with plus terminal 66 of the power supply. FIG. 12 further shows how the minus pole of the battery 58 protrudes slightly beyond the surface of the compartment member 30 to engage with the minus terminal 70 of the power supply for electrical connection of the minus pole of the battery 58 with the minus terminal 70 of the power supply. As shown in FIG. 13, the opposite plane side of the plus terminal of the battery 58 is located in a recess of the compartment member 30 preventing contact between the plane plus pole of the battery 58 and the other minus terminal 68 of the power supply. It is noted that the symmetrical positioning of two electrical minus terminals 68, 70 in relation to the compartment member 30 makes it possible to charge batteries irrespective of the pointing directions of the plane surfaces of the battery poles. Had the battery 58 been mounted in its compartment with its plane pole surfaces pointing in the opposite direction of the shown direction, the poles would still have been correctly connected to the power supply, since the plus terminal 66 would still be connected to the circular periphery of the battery 58 and the protruding minus pole would be connected to the opposite minus terminal 68.

The power supply of the battery charger 10 is adapted for simultaneous charging of four batteries, i.e. two batteries 45, 46 accommodated in two respective hearing aids 18, 20 positioned in two respective hearing aid connectors 22, 24 in the battery charger 10, and two extra batteries 58, 60 positioned in the compartment member 30.

The battery charger has a light emitting diode for indication of a charging current being supplied to a rechargeable battery.

Further, the battery charger may have a light emitting diode for indication of a selected charging, e.g. a full charge, or a fast charge, of a rechargeable battery.

FIG. 14 shows a side view of an alternative embodiment of a charger 72. The housing 74 encloses a power supply (not visible) for supplying a charging current to rechargeable batteries, and two hearing aid connectors for reception and accommodation of hearing aids 18, 20. The housing 74 has two openings (not visible) for insertion of the two STE hearing aids 18, 20. The housing 74 also comprises a compartment member 76 with one, two or more compartments (not visible) for accommodation of extra rechargeable batteries. The compartment member 76 is removably positioned in the battery charger 72. Thus, a user can remove the compartment member 76 from the battery charger 72 and in this way bring two fully recharged batteries along during the day. The compartment member 72 may for example further be adapted for insertion into a key ring for ease of transportation and retrieval by the user. The compartment member 76 comprises a ridge 73 that a user may grasp between his or her fingers. In a preferred embodiment, the compartment member 76 comprises recesses 75, 77 separated by the ridge 73 further facilitating grasping the ridge 73 by a user with possible reduced manual dexterity.

The housing 76 comprises a top part 78 and a base part 80. In a preferred embodiment of the charger 76, most of the electrical components of the charger 76 are accommodated in the base part 80 of the housing 74. The top part 78 may be removably mounted on the base part 80 of the housing 74 for ease of maintenance, cleansing or reparation of the charger 72. The top part 78 and base part 80 of the housing 74 may be equipped with joining parts (not shown) for joining the top part 78 and the base part 80 along the joining line 82. The joining parts may be adapted for snap-locking the top and base parts 78, 80 together.

FIG. 15 show another side view of a charger 72. The illustrated battery charger 72 also has a connector 84 for connection with a computer for power supply of the charger 72. The connector 84 may be a USB connector in which case the power supply of the charger 72 is adapted to operate from the 5 V supply voltage output by the computer through its USB connector.

The illustrated charger 72 also comprises an auxiliary output connector 86 for electrical connection with an external appliance, such as a headset, a mobile phone, a personal digital assistant (PDA), for supplying a charging current to said appliance. Thus, the illustrated charger 72 may be adapted to recharge the rechargeable batteries in two hearing aids, at least two extra batteries accommodated in the compartment member 76 and an additional appliance at the same time. The auxiliary output connector 86 may e.g. be a USB connector.

In FIG. 16 is illustrated a top view of a charger 72. The charger 72 comprises a connector part 88 for the accommodation of a hearing aid 18 to be charged and another connector part 90 for the accommodation of a hearing aid 20 to be charged. When the hearing aids 18, 20 are inserted into the respective removable parts 88 and 90, the removable parts 88, 90 are holding the hearing aids 18, 20 in a substantially fixed position relative to said respective removable parts 88, 90. The removable parts 88, 90 have two substantially fixed positions, one idle position (as shown in the figure) and another charging position (explained in more detail below with reference to FIG. 18). In order to charge the rechargeable batteries 45, 46 of a hearing aid 18, 20, the user places the hearing aid 18, 20, into the removable part 88, 90 in its idle position and then exerts a gentle push on said hearing aid 18, 20, whereby the removable part 88, 90 is moved into the charging position. Preferably, the removable part 88, 90 is pivotally mounted in the housing 74 of the charger 72 so that the removable part 88, 90 may be brought from its idle position to the charging position (and back from the charging position to the idle position) in a pivoting motion relative to the charger housing 74. With the removable part 88, 90 accommodating a hearing aid 18, 20 in its charging position, the removable part 88, 90 with the hearing aid 18, 20 is preferably locked in the charging position. Hereby, the charging of the hearing aid 18, 20 may not be accidentally interrupted before the hearing aid 18, 20 is fully recharged. The removable part 88, 90 and thereby the hearing aid 18, 20 may be released from the locked charging position by depressing a release button 92 that is operatively connected, preferably mechanically, to the removable parts 88, 90 in such a way that activation of the release button, e.g. by depressing it, will release the removable part 88, 90 from its locked charging position. Upon release of the removable part 88, 90 from its locked charging position, it is preferably adapted to automatically move into its idle position.

This automatic motion of the removable part 88, 90 from its locked charging position upon activation of the release button 92, may preferably be achieved by a resilient member, such as a spring connected to both charger housing 74 and the removable part 88, 90.

FIG. 17 shows a vertical cross section of the battery charger 72 shown in FIGS. 14-16, in which the actuator 94 and one of the first electrical terminals 96 are also visible. The actuator 94 is provided for accessing a battery 98 in a hearing aid 18 making the battery 98 available for connection with the first electrical terminals 96 when the hearing aid 18, 20 is positioned in the removable part 88 of the connector. The first electrical terminal 96 is connected with a printed circuit board 100, which printed circuit board 100 is connected to a power supply (not shown). The removable part 88 is shown in its idle position and is supported by a frame 89 that is hinged to the top part 78 of the charger housing 74 on the pivotal shaft 102, thus enabling the frame 89, and thereby also the removable part 88, to pivot with respect to the charger housing 74. One end of the actuator 94 is pivotally connected to the top part 78 of the housing 84 of the charger 72 on the pivotal shaft 103. The other end of the actuator 94 has an end flange 104 that is adapted for engagement with the non-hinged end 105 of the battery door 106 of the hearing aid 18 in a way similar to the opening of the battery door 106 using a fingernail.

In FIG. 18 is illustrated the same cross section of a charger 72 according to the embodiment as shown in FIG. 17, wherein the removable part 88 and thereby the hearing aid 18, is in the charging position. The removable part 88 with the hearing aid 18 in it may be brought from the idle position shown in FIG. 17 to the charging position shown in FIG. 18 by exerting a gentle pressure on the hearing aid 18, e.g. by pushing the hearing aid 18 downward into the charger housing 74 for example with the help of one or more fingers. When the hearing aid 18 is pushed downward into the charger housing 74, the frame 89, and thereby also the removable part 88, will move from the idle position to the charging position in a pivoting motion around the pivotal shaft 102. At the same time the actuator 94 will undergo a pivoting movement with respect to the pivotal shaft 103. Thus, by the relative cooperating pivoting motions of the actuator 94 and the frame 89 with respect to each other and the charger housing 74, the battery door 106 of the hearing aid 18 is opened.

The removable part 88, 90 may have outer dimensions that are adapted to fit into the frame 89 and inner dimensions that are adapted to fit to a part of the outer dimensions of a type of hearing aid. In this way, a standard charger 72 may be manufactured with a standard sized frame 89 that is adapted to accommodate to the outer dimensions to a wide variety of removable parts 88 with inner dimensions that are adapted to accommodate a vide variety of types and sizes of BTE hearing aids. This means that a standard charger according to the embodiments described herein may be used for many types of hearing aids. Before charging, the removable part that fits to the hearing aid in question is selected and mounted in the frame. This may for example be advantageous in those situations where a user has bought a set of two hearing aids together with a charger according to the embodiments, and for example two or three years later wishes or needs to change hearing aids, then such a user do not need to buy a new charger, but may merely acquire a set of suitable removable parts 88 and exchange them with those that he or she originally bought together with the charger 72. However, it should be understood that in an alternative embodiment the removable part 88 and the frame 89 may form an integrated part and as such form one single component.

FIGS. 19 and 20 shows another cross section of a charger 72 with a hearing aid 20 inserted into the removable part 90. The removable part 90 is attached to the frame 91, which is pivotally connected to the top part 78 of the charger housing 74 in the pivotal shaft 110. One end of the actuator 108 is pivotally connected to the top part 78 of the charger housing 74 and the other end of the actuator 108 has an end flange that is adapted for engaging with the non-hinged end of a battery door 116 that encloses a rechargeable battery 114. The functionality of the elements of the charger 72 illustrated in FIGS. 19 and 20 are essentially the same as for the elements illustrated in FIGS. 17 and 18 and will, thus, not be explained in further detail.

FIG. 21 shows another cross sectional view of a charger 72 in accordance some embodiments. The hearing aid 18 is positioned in the removable part (only partly shown and not numbered in this figure) in the frame 89, which is in its idle position. The actuator 94 has two protrusions 118 that are adapted to cooperate with protrusions 220 in the frame 89 in such a way that when there is no hearing aid 18 present in the removable part, the frame is locked in this its idle position due to the mutual engagement of the protrusions 118 on the actuator with the protrusions 220 on the frame 89. The connector and the frame is released from the locked idle position by insertion of a hearing aid into the removable part and establishing engagement between the hearing aid housing and the actuator 94, namely by engagement between the end flange 104 and the non-hinged end 105 of the battery door 106 of the hearing aid 18 as shown in FIG. 17. During the first pivotal movement of the actuator 94, the protrusions 118 are released from engagement with the protrusions 220 on the frame 89 and the connector with the frame is allowed to move from its idle position to its charging position when the user forces the hearing aid further downward with an appropriate force.

Also visible on the figure is a locking arm 222 that is attached to the housing 74 of the charger 72. The locking arm 222 is equipped with a wedged structure 224 that is adapted to engage with an arm 226 of the frame 89. Also visible in the figure is first electrical terminals 96, that are connectable to a power supply.

In FIG. 22 is illustrated another cross sectional view of a charger 72 in accordance with some embodiments. The hearing aid 18 is positioned in the removable part 88 in the frame 89, which is in its charging position. When the hearing frame 89 with the hearing aid is moved (pivoted) from its idle position shown in FIG. 21 to the charging position shown in FIG. 22 the first electrical terminals 96 engage in abutting contact with the member 228. When one end part of the electrical terminals 96 engage with the members 228, they are forced to carry out a pivoting motion with respect to the shafts 230 on the frame 89, whereby it is achieved that the opposite end part of the electrical terminals 96 are moved into abutting contact with the battery 106 (since as described with respect to FIGS. 17-20 the battery door opens during the movement of the hearing aid from the idle position to the charging position). The members 228 have a surface that is inclined with respect to the bottom 230 of the charger 72 in order to facilitate a soft rotation of the electrical terminals 96 during the motion of the frame 89 (with a hearing aid 18 in it) from the idle position to the charging position. The members 228 are electrically conducting and electrically connected to the printed circuit board 100, which in turn is connected to a power supply (not shown). The power supply may be external, e.g. a mains supply, or internal, e.g. provided by one or more batteries. Thus, when the frame 89 with a hearing aid 18 placed in it is moved into the charging position, the cooperation of the first electrical terminals 96, the frame 89 and the members 228 provides an electrical connection between the printed circuit board 100 and the battery 106 to be charged. Thus, through this electrical connection a charging current may be provided to the battery 106 from the printed circuit board 100. It is naturally understood that one of the terminals 226 functions as the plus terminal and the other functions as the minus terminal.

When the frame 89 is in the charging position the wedged protrusion 224 on the locking arm 222 engages with the arm 226 of the frame 89 in such a way that the frame 89 and thereby the hearing aid 18 is locked in this charging position.

FIG. 23 illustrates a semitransparent top view of a charger 72 according to some embodiments. When the frame 89 is in the charging position the wedged structure 224 (not shown) on the locking arm 222 engages with the arm 226 of the frame 89 in such a way that it is locked in this charging position. However, the locking arm 222 is mechanically connected to the release button 92 via the lever 232. By pressing the release button 92 the lever 232 caries out a pivoting motion with respect to the axis 234 to thereby disengage the locking arm 222 from its engagement with the arm 226 of the frame 89. The release button 92 comprises two sections 236 and 238 for enabling a user to selectively release one of the hearing aids 18, 20. Also visible in FIG. 23 is the two extra batteries 240, 242 in the compartment member 76.

LIST OF REFERENCE NUMERALS

Below is given a list of reference numerals used in the description of the embodiments, wherein
10, 72 battery charger
9, 11 light emitting diodes
12, 74 housing (of the charger)
14, 16 openings (for insertion of hearing aids)
18, 20 BTE hearing aids
21 hearing aid housing
22, 24, 88, 90 removable parts
25 recess (in the charger)
26, 28 Handle
27, 29 closing members
30, 76 compartment member (for accommodation of extra batteries)
31, 84 connector (e.g. USB connector)
32, 34, 94, 108 Actuator
36, 38, 96 first electrical terminals
40, 41, 42, 49 guiding walls forming at least in part guiding member
43, 44 end walls
45, 46, 98, 114 rechargeable battery
47, 48, 106, 116 battery cover or battery door
50, 104, end flange (of the actuator)
52, 105 non-hinged end of battery door
54, 100 printed circuit board
56, 80 base part (of the charger)
58, 60, 240, 242 extra batteries (accommodated in the compartment member)
62, 64 compartment for extra battery
66, 68, 70 second electrical terminals
66 plus terminal
68, 70 minus terminal
73 ridge in the compartment member
75, 77 recess in the compartment member
78 top part of the housing of the charger
82 joining line
86 auxiliary output connector
89, 91 Frame
92 release button
102, 110 pivotal shaft (of frame)
103, 112 pivotal shaft of actuator
118 protrusions (on the actuator)
220 protrusions (on the frame)
222 locking arm
224 wedged structure
226 Arm (of the frame)
228 Member
230 bottom (of the charger)
232 Lever
234 Axis
236, 238 sections of the release button

The invention claimed is:

1. A battery charger for charging a rechargeable battery which is located in a hearing aid, the battery charger comprising:
a power supply for supplying a charging current to the rechargeable battery; a hearing aid connector for reception and accommodation of the hearing aid, the connector having a set of first electrical terminals connected with the power supply and positioned for connection with the rechargeable battery when the hearing aid is positioned in the connector; and
an actuator that is adapted for engaging with and opening a battery cover of the hearing aid when the hearing aid is positioned in the connector, thereby providing access to the battery for connection with the first electrical terminals.

2. The battery charger according to claim 1, further comprising a closing member for partly closing the battery cover of the hearing aid during removal of the hearing aid from the battery charger.

3. The battery charger according to claim 1, further comprising at least one guide member for guiding the hearing aid towards the set of first electrical terminals during insertion of the hearing aid in the battery charger.

4. The battery charger according to claim 3, wherein the actuator cooperates with the at least one guide member for engaging with and opening the battery cover when the hearing aid is inserted in the battery charger.

5. The battery charger according to claim 3, wherein an opening in the charger for the insertion of the hearing aid and the at least one guide member is positioned in a removable part of the connector.

6. The battery charger according to claim 5, wherein the removable part is made of a soft material.

7. The battery charger according to claim 5, wherein the removable part is adapted for being cleaned in a dish washing machine.

8. The battery charger according to claim 1, wherein the connector is movably positioned in the battery charger between an idle position for insertion of the hearing aid into the connector and a charging position for charging the rechargeable battery of the hearing aid.

9. The battery charger according to claim 8, further comprising a first latch mechanism for locking the connector in the charging position and a release actuator for releasing the first latch mechanism allowing the connector to move from the charging position to the idle position.

10. The battery charger according to claim 9, further comprising a second latch mechanism for locking the connector in the idle position, the second latch mechanism being released upon insertion of the hearing aid into the connector allowing the connector to move from the idle position to the charging position.

11. The battery charger according to claim 1, wherein the connector is pivotally mounted on a shaft in the battery charger.

12. The battery charger according to claim 1, further comprising a detector for detecting whether the battery that is connected to the first electrical terminals is a non-rechargeable battery or a rechargeable battery, and for preventing supplying power to the battery when it is detected as non-rechargeable.

13. The battery charger according to claim 1, further comprising a compartment for storing a rechargeable battery that is not located in a hearing aid, wherein the battery charger further has second electrical terminals positioned for contacting the rechargeable battery that is not located in a hearing aid, the second electrical terminals being connected to the power supply for charging the rechargeable battery.

14. The battery charger according to claim 13, wherein the second electrical terminals are positioned for operational connection with the battery that is not located in a hearing aid independent of its positional orientation.

15. The battery charger according to claim 13, wherein the compartment is positioned in a compartment member that is removably positioned in the battery charger.

16. The battery charger according to claim 1, further comprising an additional hearing aid connector for charging an additional rechargeable battery in an additional hearing aid.

17. The battery charger according to claim 16, wherein the hearing aid connector and the additional hearing aid connector are configured for simultaneous charging the respective rechargeable batteries.

* * * * *